(12) United States Patent
Okamoto

(10) Patent No.: US 7,682,721 B2
(45) Date of Patent: Mar. 23, 2010

(54) FUEL CELL SYSTEM

(75) Inventor: Masaru Okamoto, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 759 days.

(21) Appl. No.: 10/589,438

(22) PCT Filed: Feb. 10, 2005

(86) PCT No.: PCT/JP2005/002519

§ 371 (c)(1),
(2), (4) Date: Aug. 15, 2006

(87) PCT Pub. No.: WO2005/078845

PCT Pub. Date: Aug. 25, 2005

(65) Prior Publication Data

US 2007/0166582 A1    Jul. 19, 2007

(30) Foreign Application Priority Data

Feb. 17, 2004    (JP) .............................. 2004-039884

(51) Int. Cl.
*H01M 8/04*    (2006.01)
(52) U.S. Cl. .............................. 429/25; 429/13; 429/22; 429/23
(58) Field of Classification Search ........................ None
See application file for complete search history.

(56) References Cited

U.S. PATENT DOCUMENTS

| 6,068,942 | A  | 5/2000  | Strasser et al. |
|-----------|----|---------|-----------------|
| 2001/0055705 | A1 | 12/2001 | Yagi          |
| 2002/0098393 | A1 | 7/2002  | Dine et al.   |
| 2003/0224228 | A1 | 12/2003 | Reiser et al. |

FOREIGN PATENT DOCUMENTS

| JP | 6-333586   | A | 12/1994 |
|----|------------|---|---------|
| JP | 7-183039   | A | 7/1995  |
| JP | 10-144334  | A | 5/1998  |
| JP | 11-026003  | A | 1/1999  |

*Primary Examiner*—Patrick Ryan
*Assistant Examiner*—Cynthia Lee
(74) *Attorney, Agent, or Firm*—Foley & Lardner LLP

(57) ABSTRACT

A fuel cell system and a related operating method are disclosed. The system includes a fuel cell body 1 having an anode electrode supplied with fuel gas containing hydrogen and a cathode electrode supplied with oxidizer gas, a catalyst degradation-suppressing means operative to interrupt supplying oxidizer gas to the cathode electrode after disconnecting the external load from the fuel cell body 1 and allow a load current, generated by the fuel cell body 1, to be extracted by an internal load 26 while supplying fuel gas to the anode electrode, a hydrogen supply stop means operative to interrupt a supply of fuel gas to the anode electrode during a period in which the load current is extracted by the internal load, and load current control means controlling a target load current such that after the supply of fuel gas to the anode electrode is stopped, a pressure inside the anode electrode is maintained at a target pressure.

14 Claims, 13 Drawing Sheets

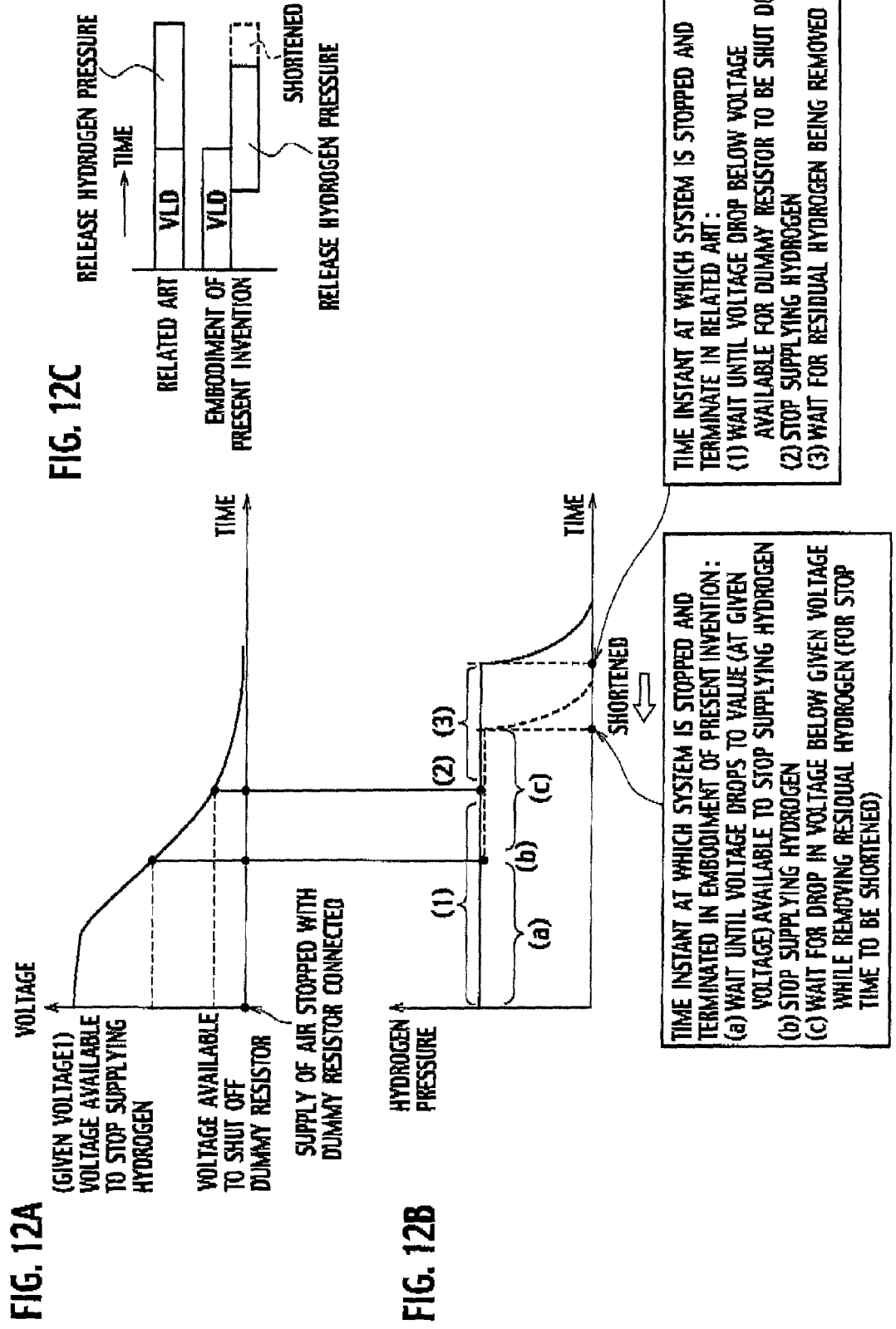

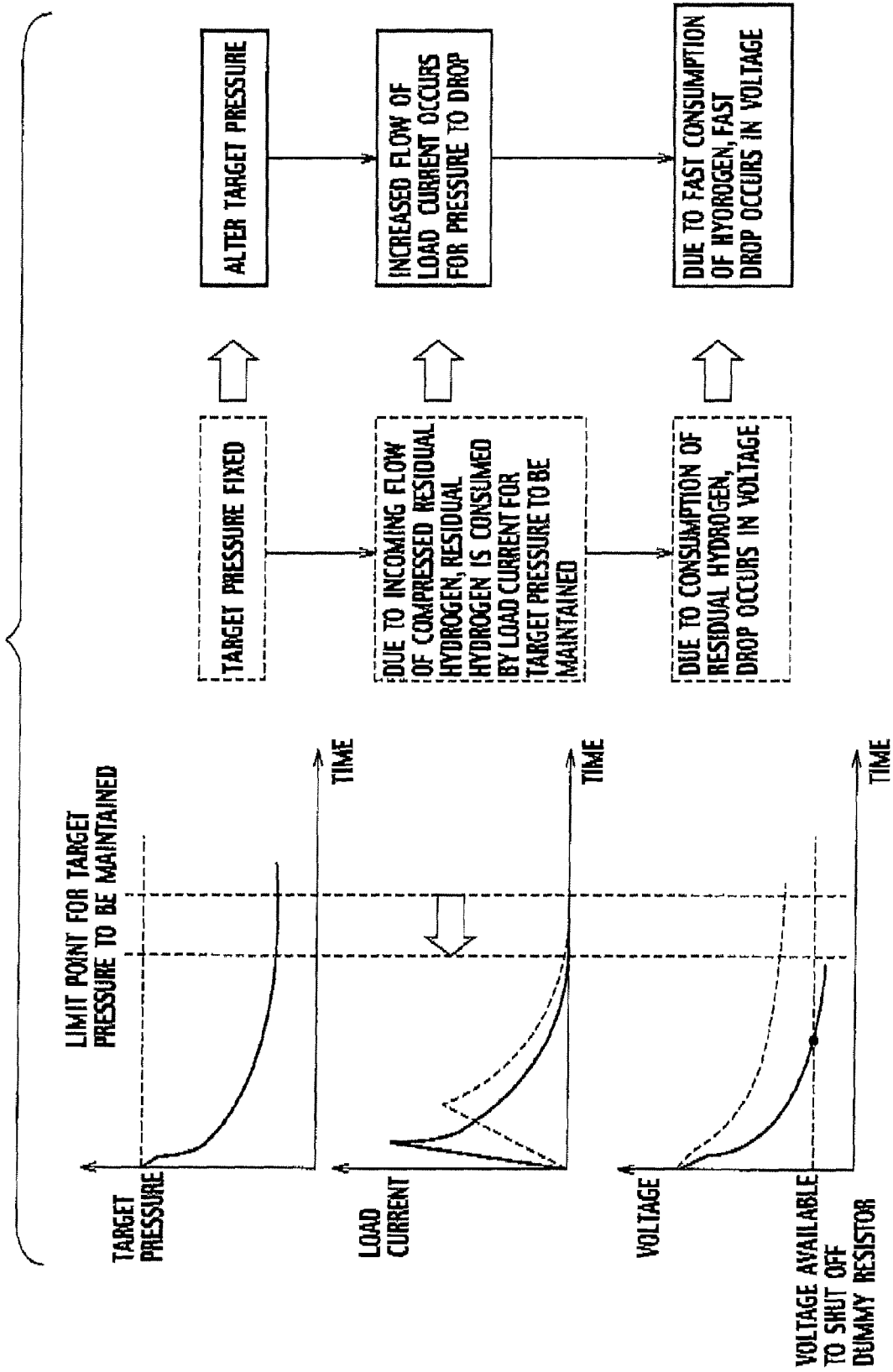

FUEL CELL SYSTEM

TECHNICAL FIELD

The present invention relates to fuel cell systems and, more particularly, to a fuel cell system having an internal load through which a load current is extracted from the fuel cell body when stopping the operation of the fuel cell system.

BACKGROUND ART

A fuel cell system is an electric power generation system, operative to achieve electrochemical reaction between hydrogen, obtained by reforming fuel such as natural gas, and oxygen in air for directly generating electric power, which is able to effectively utilize chemical energy owned by fuel and has characteristics friendly to environments, and research and development work has been undertaken in a full scale to commercially apply the fuel cell system into practical use.

When stopping the operation of the fuel cell system, first, external loads, such as a drive motor, are disconnected from a fuel cell body. When this takes place, since no load current flows, no load voltage appears in a voltage across an anode electrode and a cathode electrode of the fuel cell body, resulting in a high voltage condition that exceeds a value of 0.8V per unit cell. If a platinum (Pt) catalyst of a fuel cell is exposed to such a high voltage condition, the ionization of platinum rapidly occurs, causing dissolving degradation of platinum to occur in the cathode electrode. The ionized platinum readily couples to oxygen to form oxidized platinum (PtO), which provides no contribution to electrical power generation with remarkable reduction in an effective active area of the catalyst.

To prevent such degradation, the voltage of the fuel cell body needs to be lowered as fast as possible. To this end, with a fuel cell system disclosed in Japanese Patent Provisional Publication No. 6-333586, connecting a dummy resistor to a fuel cell during a halt thereof causes a load current to be extracted from a fuel cell body to induce a drop in a voltage. When this takes place, hydrogen is continuously supplied to an anode electrode so as to avoid a shortage of hydrogen while stopping the supply of oxygen to a cathode electrode to allow residual oxygen to be consumed for drop in voltage.

DISCLOSURE OF INVENTION

During the shutoff operation of the fuel cell system, issues arise in the following respects:

(1) If the shortage of hydrogen takes place when the load current is extracted from the fuel cell body, carbon, which carries an electrode catalyst, and water react one another. This results in remarkable reduction in an effective active area of the cathode electrode catalyst with the resultant degradation in performance. This degradation results in larger damages than those caused by platinum dissolution.

(2) If attempts are made to decrease the load current in expectation of a safety, an increased stop time results in and, for the purposes of shortening the stop time, if attempts are made to allow the load current to lie at an appropriately increased value, a probability occurs in which a shortage of hydrogen takes place this time with the resultant degradation.

(3) With the fuel cell system applied to an automotive vehicle, the stop time of the fuel cell system may be preferably short as less as possible. It is thus preferable for the voltage to be lowered as fast as possible only for the stop time to be shortened.

(4) In normal practice, the fuel cell system is stopped by permitting gas pressures, remaining in the cathode electrode and the anode electrode of the fuel ell body, to be lowered to the atmospheric pressure. The gas pressure of the cathode electrode is lowered during electric power generation by connecting the dummy resistor to the fuel cell body with no supply of air to the cathode electrode in a manner described above. Further, air is not flammable gas and, hence, no issues occur even if the voltage drops to allow the dummy resistor to be disconnected and air is discharged to the atmosphere upon the stopping of the system. However, due to the operation in which hydrogen is continuously supplied to the fuel cell body with a view to preventing the shortage of hydrogen during a period in which the load current is extracted with the dummy resistor, hydrogen gas continuously remains in the anode electrode. Therefore, there is a need for hydrogen gas, remaining in the inside of the anode electrode, to be exhausted to lower the pressure of the anode electrode to the atmospheric pressure after the voltage drops and the dummy resistor is shutoff. However, since hydrogen is flammable gas, it cannot be exhausted to the atmosphere at once. Also, if hydrogen is exhausted at once, the pressure of the anode electrode transiently increases and, hence, hydrogen cannot be exhausted at once also in view of preserving a differential pressure upper limit margin between the cathode electrode and the anode electrode. Therefore, an attempt needs to be made for hydrogen to be exhausted to a dilution vessel at a small flow rate to allow hydrogen to be stirred for mixing with a large volume of air using a fan, upon which hydrogen is exhausted under a diluted condition. Accordingly, it takes a long time with the resultant increase in the stop time before the pressure of the anode electrode drops to the atmosphere.

The present invention has been completed with the above issues in mind and, according to one aspect of the present invention, there is provided a fuel cell system comprising a fuel cell body having an anode electrode supplied with fuel gas containing hydrogen and a cathode electrode supplied with oxidizer gas, a catalyst degradation-suppressing device operative to interrupt supplying oxidizer gas to the cathode electrode after disconnecting the external load from the fuel cell body and allow a load current, generated by the fuel cell body, to be extracted by an internal load while supplying the fuel gas to the anode electrode, a hydrogen supply stop device operative to interrupt a supply of the fuel gas to the anode electrode except for residual hydrogen being supplied thereto during a period in which the load current is extracted by the internal load, and a load current control device controlling a target load current such that after the supply of fuel gas to the anode electrode is stopped, a pressure inside the anode electrode is maintained at a target pressure.

Another aspect of the present invention provides a method of operating a fuel cell system, comprising providing a fuel cell body having an anode electrode supplied with fuel gas containing hydrogen and a cathode electrode supplied with oxidizer gas for supplying electric power to an external load, providing an internal load, interrupting a supply of oxidizer gas to the cathode electrode after disconnecting the external load from the fuel cell body, connecting the internal load to the fuel cell body to allow a load current to be extracted from the fuel cell body while supplying the fuel gas to the anode electrode, interrupting a supply of the fuel gas to the anode electrode except for residual hydrogen being supplied thereto during a period in which the load current is extracted by the internal load, and controlling a target load current such that after the supply of fuel gas to the anode electrode is interrupted, a pressure inside the anode electrode is maintained at a target pressure.

BRIEF DESCRIPTION OF THE DRAWINGS

FIGS. 12A to 12C are views illustrating first effects resulting from the first and second embodiments.

FIG. 15 is a view illustrating fourth effects resulting from the first and second embodiments.

BEST MODE FOR CARRYING OUT THE INVENTION

Figure 1:
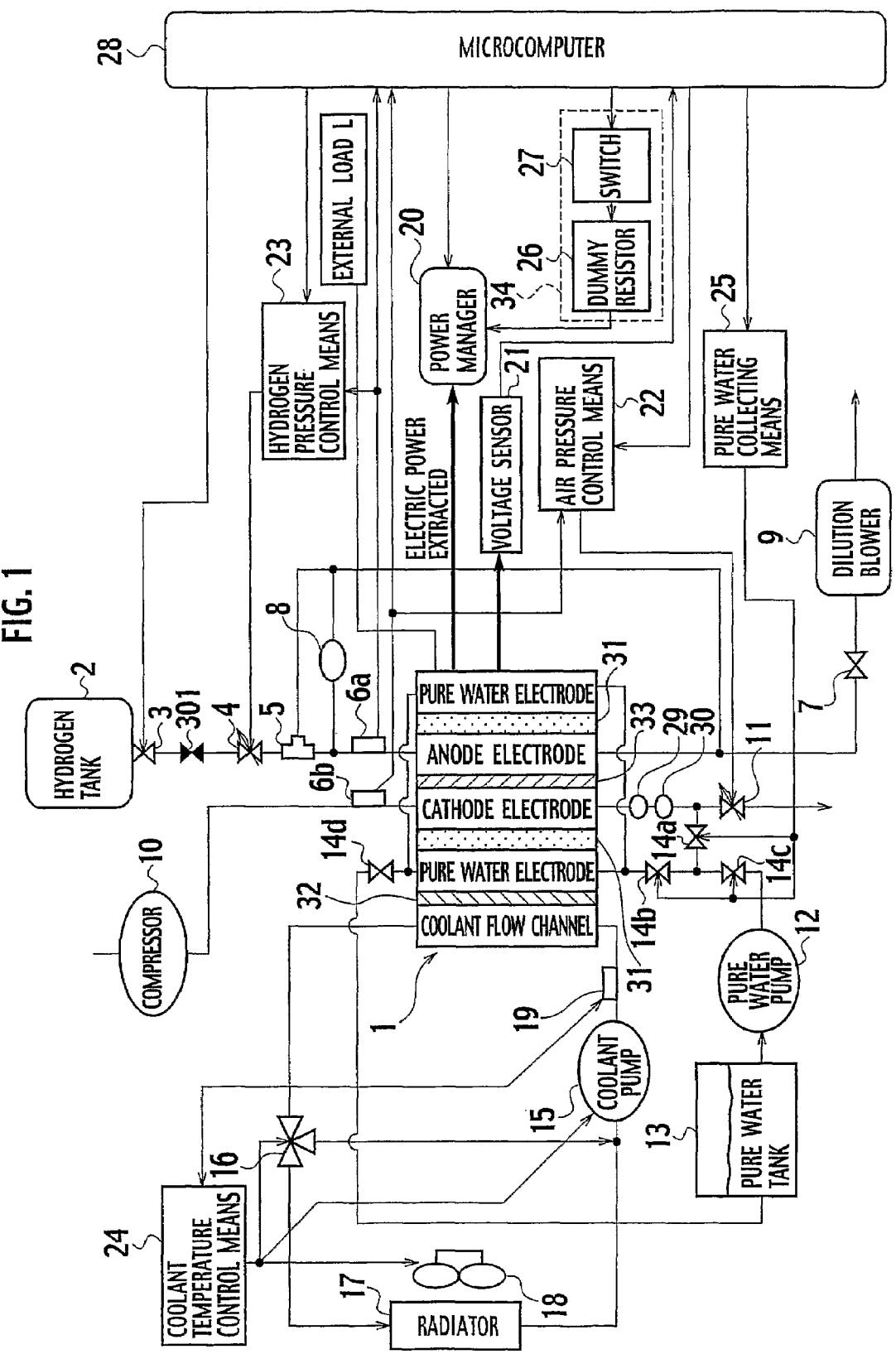
FIG. 1 is a block diagram illustrating a fuel cell system of a first embodiment according to the present invention.

Reference will now be made in detail to embodiments according to the present invention which is illustrated in the accompanying drawings. Throughout the drawings, the same or like component parts bear the same or like reference numerals.

FIRST EMBODIMENT

As shown in FIG. 1, with a fuel cell system of a first embodiment, a fuel cell body 1 has an anode electrode supplied with fuel gas, such as hydrogen, and a cathode electrode supplied with oxidizer gas, such as air, for electrochemically reacting hydrogen and oxygen to generate electric power and heat, resulting from electric power generation, is radiated via cooling water (coolant) flowing through coolant flow channels. The anode electrode and the cathode electrode are placed adjacent one another by means of an electrolyte membrane 33. Disposed on the anode electrode and the cathode electrode on outsides thereof via separators 31, respectively, are pure water electrodes. Also disposed on the pure water electrode via a separator 32 on a side close to the cathode electrode is a coolant flow channel. Electrode reactions take place in the fuel cell body 1 to generate electric power as the following reactions (1) and (2).

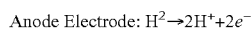

Anode Electrode: $H^2 \rightarrow 2H^+ + 2e^-$     (1)

Cathode Electrode: $2H^+ + 2e^- + (½)O_2 \rightarrow H_2O$     (2)

Hydrogen gas stored in a hydrogen tank 2 is supplied to the anode electrode via a hydrogen supply base valve (ON/OFF valve) 3 serving as a hydrogen supply stop device, a pressure reduction valve 301 and a hydrogen pressure regulator valve (variable valve) 4. The pressure reduction valve 301 mechanically reduces hydrogen pressure to a given pressure. The hydrogen pressure regulator valve 4 regulates the hydrogen pressure inside the anode electrode to a desired value. The hydrogen pressure of the anode electrode is controlled by a hydrogen pressure control means 23 that is operative to allow the hydrogen pressure, detected by a pressure sensor 6a, to be fed back to the hydrogen pressure regulator valve 4 that is consequently driven. Controlling the hydrogen pressure to a fixed level causes hydrogen to be automatically compensated by a rate equal to a rate of hydrogen consumed by the fuel cell body 1. Connected between an inlet and an outlet of the anode electrode is an ejector 5, by which hydrogen (exhaust hydrogen), expelled from the outlet without being consumed in the anode electrode, is circulated to the inlet of the anode electrode, and a hydrogen circulation pump 8 that compensates a region in which the ejector 5 does not cover. Connected to the outlet of the anode electrode are a purge valve (ON/OFF valve) 7 through which hydrogen (exhaust hydrogen), expelled from the anode electrode, is purged, and a dilution blower 9 by which hydrogen, purged from the purge valve 7, is diluted with air to a hydrogen concentration less than a flammable concentration for exhaust to an outside of a vehicle. The purge valve 7 plays a role to discharge nitrogen accumulated in a hydrogen delivery line for enhancing a hydrogen circulating function and a role to blow out clogged water that stops up in gas flow channels.

Supplied to the cathode electrode of the fuel cell body 1 is compressed air delivered from a compressor 10. Connected to an outlet of the cathode electrode is an air pressure regulator valve (variable valve) 11. The air pressure of the cathode electrode is controlled by an air pressure control means 22 by which an air pressure, detected by a pressure sensor 6b, is fed back to the air pressure regulator valve 11 that is consequently driven. Also, connected to the outlet of the cathode electrode are a sensor 29, for measuring a moisture concentration of cathode exhaust air, and a sensor 30 that measures a hydrogen concentration of cathode exhaust air.

Pure water, stored in a pure water tank 13, is supplied to the pure water electrode of the fuel cell body 1 by a pure water pump 12. Disposed on a pure water flow channel are pure water collecting valves 14a to 14c and a pure water shutoff valve (ON/OFF valve) 14d. Also, the pure water collecting valve 14b has a shutoff function. When hydrogen is supplied to the anode electrode with no pure water being circulated during startup and halt of the system, closing both the pure water collecting valve 14b and the pure water shutoff valve 14d allows hydrogen to be suppressed from leaking to a pure water delivery conduit. A pure water collecting means 25 allows the pure water collecting valves 14a to 14c to be driven for thereby permitted pure water, remaining in the pure water electrodes of the fuel cell body 1 and pure water delivery conduits, to be collected to the pure water tank 13 using the air pressure. If the system is stopped under a condition with pure water remaining intact in the pure water electrodes, probabilities occur wherein pure water expands to cause damages to the fuel cell body 1 under temperatures below a freezing point and, hence, pure water is collected to the pure water tank 13.

The air pressure, the hydrogen pressure and the pure water pressure are determined in consideration of electric power generating efficiency and water balance and managed to respective given differential pressures to preclude the occurrence of distortion in the electrolyte membrane 33 and the separators 31, 32.

Coolant water is supplied to the coolant water flow channels of the fuel cell body 1 by the coolant water pump 15. Further, disposed in the coolant water flow channels are a three-way valve 16 and a radiator 17, and the three-way valve 16 is operative to switch coolant water flow to the radiator or a bypass passage of the radiator to cause split-flows. Rotating a radiator fan 18 cools coolant water flowing through the radiator 17. The temperature of coolant water is regulated by a coolant water temperature control means 24 that allows a coolant water temperature, detected by the temperature sensor 19, to be fed back to and drive the three-way valve 16 and the radiator fan 18.

Further, the fuel cell system is comprised of a power manager 20, serving as a load current control device, through which electric power, generated by the fuel cell body 1, is extracted and supplied to external loads L such as an electric motor (not shown) by which the vehicle is driven, a voltage sensor 21 that detects a given voltage, at which the hydrogen supply is to be interrupted in a manner as will be described later, during a drop in a voltage of the fuel cell body 1, an oxygen consumption means 34 connected to the power manager 20, and a microcomputer 28, composed of a central processing unit (CPU) and associated peripheral interfaces, which serves as a catalyst degradation-suppressing device as will be described below. The oxygen consumption means 34 is comprised of an internal load (dummy resistor) 26 by which a load current generated in the fuel cell body 1 is extracted, and a switch 27 by which the fuel cell body 1 and the dummy resistor 26 are connected or disconnected. Here, the oxygen consumption means 34 includes a dummy-resistor variable resistor device that is able to control the load current, to be extracted, at an arbitrary rate in response to commands delivered to the power manager 20. Also, the extracted electric power is charged to a battery. The power manager 20 internally incorporates a DCDC. The dummy resistor 26 is used for suppressing corrosion degrading of a cathode catalyst induced by hydrogen distribution on the anode electrode of each unit cell of the fuel cell body 1. In particular, under circumstances where hydrogen distribution occurs on the anode electrode of the unit cell when starting supply of hydrogen during startup of a fuel cell power plant system, the switch 27 is controlled to turn on or turn off the dummy resistor 26 to suppress corrosion degrading of the cathode catalyst.

Figure 2:
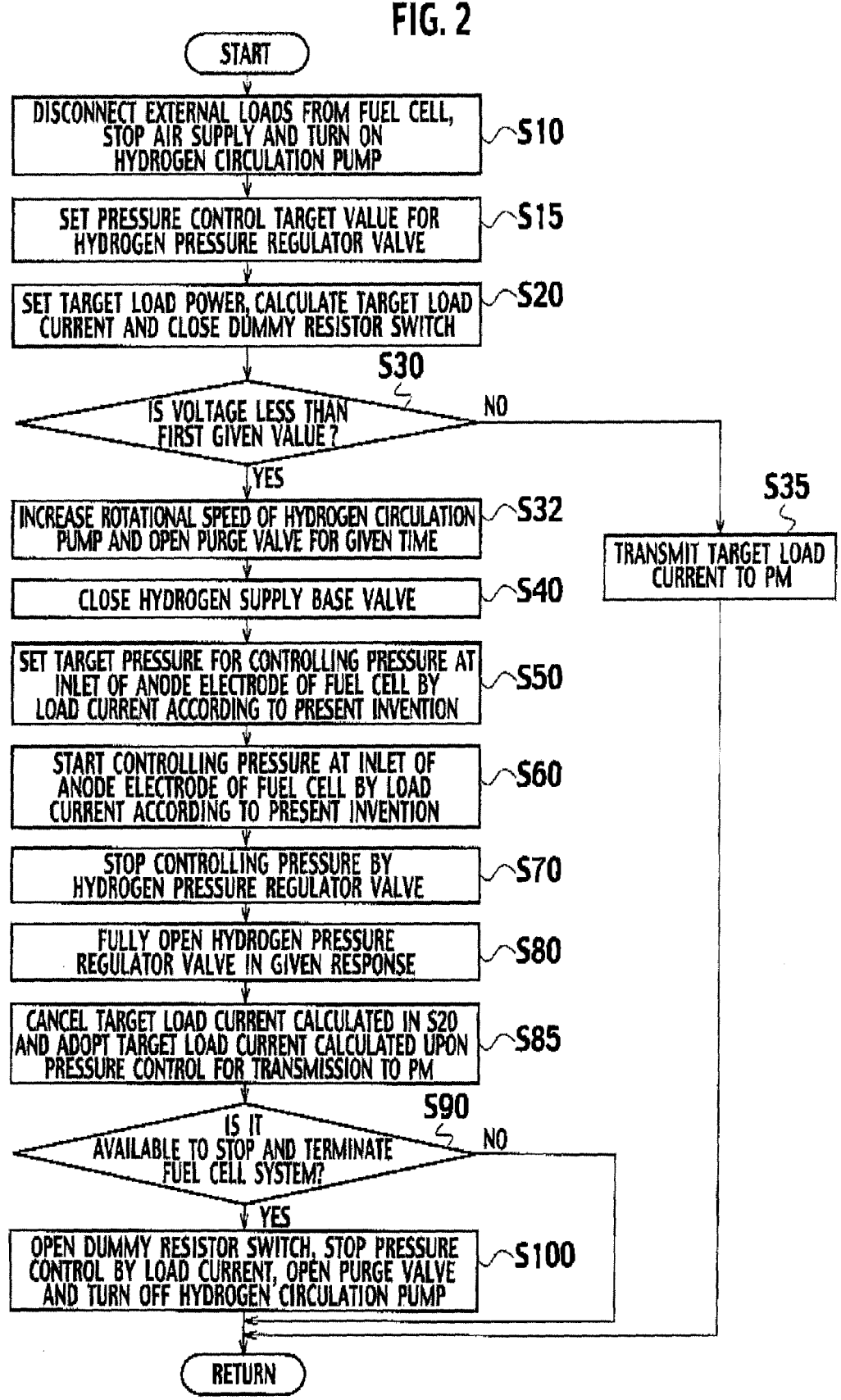
FIG. 2 is a flowchart illustrating for stopping the operation of the fuel cell system shown in FIG. 1.

Now, referring to FIG. 2, a basic sequence of operations of stopping the operation of the fuel cell system shown in FIG. 1.

(I) In S10, external loads L, such as a vehicle drive motor, are disconnected from the fuel cell body 1. Further, at the same time, the compressor 10 is stopped to interrupt the supply of air to the cathode electrode, while fully opening the air regulator valve 11. Also, the anode electrode is continuously supplied with hydrogen. The hydrogen circulation pump 8 is also continuously operated.

In S10, since the external loads L are disconnected from the fuel cell body 1, no load condition takes place in the fuel cell body 1 and a voltage of the fuel cell body 1 rises to a no-load voltage. Upon exposure of a platinum catalyst of the fuel cell body 1 to a high voltage, rapid reactions proceeds to cause the platinum catalyst to be ionized with the resultant reduction in an active effective surface area of the platinum catalyst to cause degradation. Normally, if the voltage exceeds a value of 0.8V per unit cell, then, dissolving degradation of the platinum catalyst rapidly proceeds. Under no-load condition, the fuel cell body 1 assumes such a status with the voltage exceeding the value of 0.8V or takes a voltage condition closer to such a status.

(II) In S15, the operation is executed to set a target value (pressure control target value) of the hydrogen pressure to be controlled by the hydrogen pressure regulator valve 4. Since the supply of air is stopped in S10, the air pressure lies at the atmospheric pressure. As used herein, the term "target pressure" refers to a differential pressure upper limit value between the cathode electrode and the anode electrode. The target pressure is a product, in which the differential pressure upper limit value is added to the atmospheric pressure, and due to the stop of supplying air, an anode target pressure is unable to take a high pressure. Accordingly, if an increased load current is extracted, there is a high risk with a transient shortage in hydrogen. To avoid such a risk, preliminary experimental tests have been conducted to obtain an appropriate load electric power and it is set to a value of 10 kW.

(III) In S20, the operation is executed to set the target value (target load power) of the load electric power [W] to be consumed by the dummy resistor 26 and, depending on this target load power, a target value (target load current) of the load current [A] to be extracted by the fuel cell body 1 is calculated in the following equation (3):

Target Load Current [A] =Target load power [W]÷ Fuel Cell Voltage [V]  (3)

where the fuel cell voltage represents a value of the voltage sensor 21.

Concurrently, the dummy resistor switch 27 is closed to connect the fuel cell body 1 ad the dummy resistor 26 to one another. This enables the dummy resistor 26 to extract the load current from the fuel cell body 1. Here, the target load current is delivered to the power manager 20 and the power manager 20 operates to create a difference in potential so as to allow the dummy resistor 26 to extract the target load power.

In order to suppress degradation caused by platinum dissolution, there is a need for lowering the voltage as fast as possible and, to this end, a need arises to extract as large load current as possible. In S20, since the dummy resistor 26 is connected to the fuel cell body 1 to allow the load current to flow through the dummy load 26, a drop in voltage occurs in the fuel cell body 1. This enables the suppression in dissolution degradation of the platinum catalyst. In this moment, hydrogen is continuously supplied to the anode electrode with no air being supplied to the cathode electrode and oxygen is consumed on the cathode 20 electrode with the resultant rapid drop in voltage. Also, another advantage takes place in action wherein the presence of continuous supply of hydrogen to the anode electrode allows hydrogen to cross over to the cathode electrode to cause reduction in the oxidized catalyst (PtO). Since hydrogen is continuously supplied to the anode electrode, no fear occurs in a shortage of hydrogen.

(IV) In S30, discrimination is made whether the voltage of the fuel cell body 1 becomes less than a first given value. As used herein, the term "first given value" refers to a voltage that forms a criterion based on which discrimination is made whether to stop the supply of hydrogen. If the voltage is less than the first given value (with YES in S30), the operation proceeds to S32 and if the voltage exceeds the first given value (with NO in S30), the operation proceeds to S35. In S35, the target load current is delivered to the power manager (PM) 20 and, thereafter, the operation is jumped to "RETURN".

(V) In S32, the rotational speed of the hydrogen circulation pump 8 is increased. Also, the purge valve 7 is opened for a given time interval and, thereafter, closed. Increasing the rotational speed of the hydrogen circulation pump 8 causes an increase in the amount of hydrogen passing through the anode electrode of the fuel cell body 1 such that the shortage of hydrogen is avoided when the supply of hydrogen is stopped and the load current is caused to flow through the dummy resistor 26 while consuming hydrogen. Opening the purge valve 7 allows gaseous impurities, other than hydrogen, staying on the anode electrode to be purged to enable fresh hydrogen to enter the inside of the anode electrode. This enables the prevention of the occurrence of shortage of hydrogen during a period wherein the hydrogen supply is stopped and the load current is caused to flow through the dummy resistor 26 while consuming hydrogen.

(VI) In S40, the hydrogen supply base valve 3 is closed to stop the supply of hydrogen from the hydrogen tank 2. That is, the supply of hydrogen is stopped in the course of continuing the consumption of the load current with the dummy resistor 26 under a condition in which no voltage adequately drops yet. Even if the hydrogen supply base valve 3 is closed, compressed hydrogen gas remains in a downstream of the hydrogen supply base valve 3 and no hydrogen immediately disappears. It is thus possible for the dummy resistor 26 to continuously consume the load current.

In normal practice, when stopping the operation of the fuel cell system, compressed hydrogen is exhausted from the downstream of the hydrogen supply base valve 3 to allow a residual pressure of the anode electrode to drop to the atmospheric pressure whereupon the system is halted. If the hydrogen supply is stopped when the voltage drops to a sufficient level with no need for the dummy resistor 26 to consume the load current, from this moment, compressed hydrogen needs to be exhausted from the downstream of the hydrogen supply base valve 3 to allow the residual pressure of the anode electrode to drop to the atmospheric pressure. When this takes place, although hydrogen Nay be possibly exhausted to the atmosphere at once, hydrogen gas is flammable gas and cannot be discharged to the atmosphere at once. Therefore, hydrogen is expelled to a dilution vessel in which hydrogen is mixed with a large volume of air by the action of the dilution blower 9 whereupon a mixture of hydrogen and air is exhausted to the atmosphere. Consequently, it takes a long time to cause the residual pressure of the anode electrode to drop to the atmospheric pressure, with the resultant increase in a stop time.

Further, due to the presence of compressed hydrogen remaining in the downstream of the hydrogen supply base valve 3, if an attempt is made cause the residual pressure to drop to the atmospheric pressure at once, then, a large volume of hydrogen passes across the anode electrode of the fuel cell body 1 to be exhausted to the atmosphere. When this takes place, the pressure of the anode electrode rises with the resultant probability in which the residual pressure exceeds a differential pressure upper limit value between the cathode electrode and the anode electrode. For this reason, there is a need for the residual pressure of the anode electrode to drop to the atmospheric pressure while permitting a differential pressure between the cathode electrode and the anode electrode to be kept at a value less than the upper limit value. Thus, it takes a long time with the resultant increase in the stop time.

If the hydrogen supply is stopped in the course of the consumption of the load current with the dummy resistor 26, like in S40, to cause electric power generation, the load current, flowing through the dummy resistor 26, consumes residual hydrogen. This shortens the time in which the residual pressure of the anode electrode drops to the atmospheric pressure, enabling the reduction in the stop time.

Figure 3:
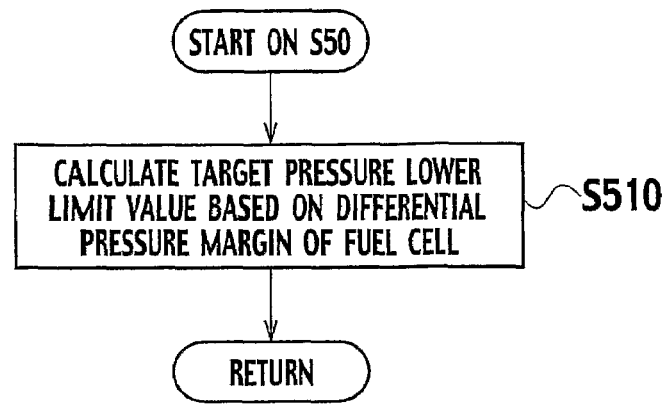
FIG. 3 is a flowchart illustrating a detailed operation of S50 shown in FIG. 2.

(VII) In S50, the target pressure is set for the pressure at the inlet of the anode electrode to be controlled by the load current according to the present invention. Here, as shown in FIG. 3, a "target pressure lower limit vale" is a product of the pressure of the anode electrode to which the differential pressure upper limit vale between the cathode electrode and the anode electrode is added. Also, since the hydrogen supply has been already stopped, the pressure of the cathode electrode lies at the atmospheric pressure.

Figure 6:
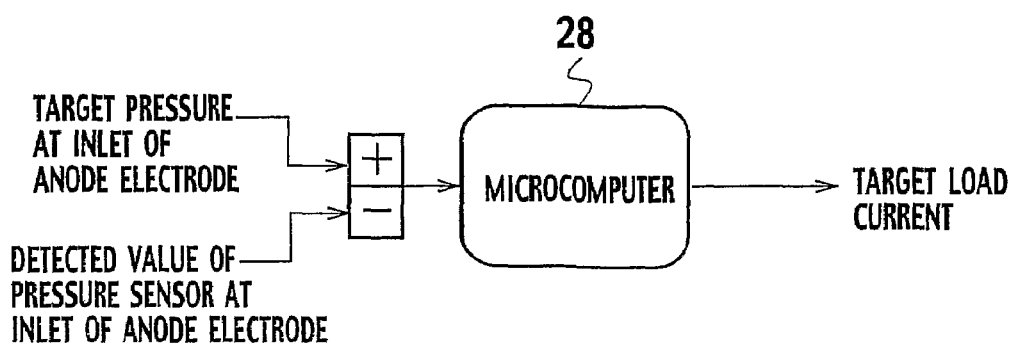
FIG. 6 is a block diagram illustrating a sequence of obtaining a target load current from a target pressure and a measured value of a pressure sensor at an inlet of an anode electrode using a microcomputer shown in FIG. 1.

(VIII) In S60, the pressure at the inlet of the anode electrode begins to be controlled by the use of the load current according to the present invention. As shown in FIG. 6, during this operation, the "target load current" is obtained from the target pressure and a measured value of the pressure sensor 6a, placed at the inlet of the anode electrode, using the microcomputer 28 as a PI controller.

(IX) In S70, the operation is executed to stop controlling the pressure at the inlet of the anode electrode by the hydrogen pressure regulator valve 4. More particularly, since in S40, the hydrogen supply base valve 3 is closed to stop the supply of hydrogen, the pressure control of the hydrogen pressure regulator valve 4 is stopped and switched to the controlling of the pressure at the inlet of the anode electrode with the load current according to the present invention.

Then in S80, the hydrogen pressure regulator valve 4 is progressively and fully opened in a given response. Even if the hydrogen pressure regulator valve 4 is fully opened at once, no probability occurs in which the anode electrode pressure exceeds the differential pressure upper limit value due to the start of control for the pressure at the inlet of the anode electrode with the load current according to the present invention, but the hydrogen pressure regulator valve 4 is fully opened at a given time constant upon consideration of a delay in control.

(X) In S85, by canceling the target load current calculated in S20, the target load current, calculated upon the control of the pressure at the inlet of the anode electrode with the load current according to the present invention, is adopted and delivered to the power manager (PM) 20.

For the purpose of shortening the stop time, the hydrogen supply is stopped under a condition where the dummy resistor 26 is used in S40 to consume the load current while the voltage remains at the high level such that residual hydrogen is consumed by causing the load current to flow through the dummy resistor 26. However, in the absence of appropriate load current, a shortage of hydrogen takes place. If the shortage of hydrogen occurs, protons run short and, to compensate the shortage of protons, reaction takes place on the cathode electrode among the cathode catalyst and carbon material, supporting the catalyst, and water ($H_2O$). This results in reduction in effective surface area of the cathode catalyst to cause corrosion degrading reaction to take place with the resultant remarkable increase in damages to the fuel cell.

Since the fuel cell system of the first embodiment including the hydrogen supply line provided with the hydrogen supply base valve 3 and the hydrogen pressure regulator valve 4, even if the hydrogen supply base valve 3 is closed, compressed hydrogen is present in its downstream. The pressure prevailing between the hydrogen supply base valve 3 and the hydrogen pressure regulator valve 4 lies at a higher level than those prevailing at the hydrogen pressure regulator valve 4 and the inlet of the anode electrode. Therefore, residual hydrogen flows into the anode electrode of the fuel cell body 1 on and on. If the flow of hydrogen is left intact, the anode electrode pressure increases on and on. In this moment, if the load current is extracted for consumption of hydrogen, the pressure rise can be suppressed. Here, handling the amount of hydrogen to be consumed by the load current in a way to obtain the "target pressure" provides an action in which hydrogen, flowing into the anode electrode, and hydrogen, consumed with the load current, are maintained to match to one another. Due to such an action, hydrogen can be consumed by the load current at the same rate as that incoming to the anode electrode and, thus, the anode electrode pressure can be maintained at the "target pressure". Also, it becomes possible to avoid risks of shortage in hydrogen in the course of causing the load current to flow through the dummy resistor 26 for consumption of hydrogen while the hydrogen supply is stopped.

(XI) In S90, discrimination is made whether it is available to stop the fuel cell system. A detail of this operation will be described below with reference to FIG. 4. If the fuel cell system is available to be stopped (with YES in S90), the operation proceeds to S100, thereby executing stop operations of the fuel cell system. In particular, the dummy resistor switch 27 is opened and the hydrogen circulation pump 8 is stopped in operation while interrupting the control of pressure at the inlet of the anode electrode by the use of the load current according to the present invention, whereupon the purge valve 7 is opened. If it is unavailable to stop and terminate the fuel cell system (with NO in S90), the operation is jumped intact to step of "RETURN".

Figure 4:
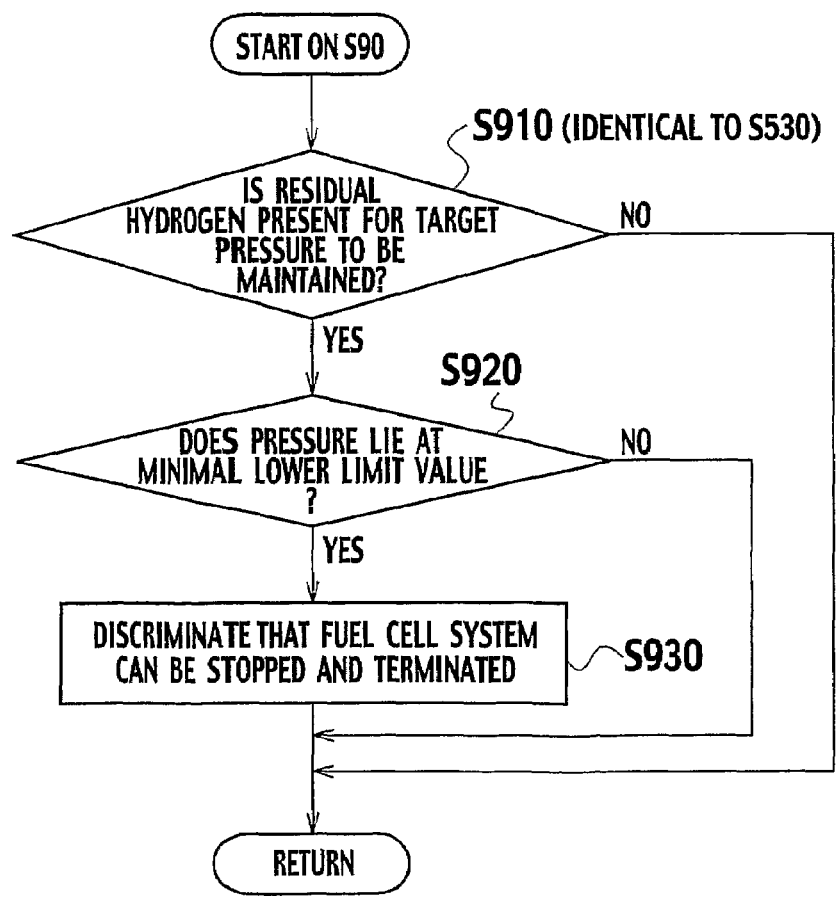
FIG. 4 is a flowchart illustrating a detailed operation of S90 shown in FIG. 2.

Next, description is made of detailed operations in S90 with reference to FIG. 4.

(A) In S910, discrimination is made whether no residual hydrogen available for the target pressure to be maintained is present. Detailed operations of S910 are described below with reference to FIG. 5. If no residual hydrogen available to maintain the target pressure is absent (with YES in S910), the operation proceeds to S920. If residual hydrogen available to maintain the target pressure is still present (with NO in S910), the operation is jumped intact to step of "RETURN".

(B) In S920, discrimination is made whether the pressure in the anode electrode lies at the target pressure lower limit value. Since the target pressure lower limit value is determined in S50 based on a formula expressed as "Target Pressure Lower Limit Value=Pressure in Cathode Electrode+ (Differential-Pressure Restricting Upper Limit Value)", a pressure remains in the anode electrode of the fuel cell by a value corresponding to this pressure difference. In this moment, there is a condition under which the last of hydrogen is no more present in a value for the target pressure lower limit value to be maintained and a merely small amount of hydrogen is left to the extent corresponding to a limit by which the target pressure lower limit value is maintained. Therefore, even in the presence of residual hydrogen discharged at once, no probabilities occur for hydrogen to flow in a large amount that exceeds a differential-pressure restricting margin between the cathode electrode and the anode electrode. Accordingly, if the pressure of the anode electrode lies at the target pressure lower limit value (with YES in S920), discrimination is made in S930 that it is possible to stop the fuel cell system.

With the first embodiment, it is contemplated that no discrimination is made that it is possible to stop and finish the operation of the fuel cell system even in the presence of a drop in voltage to a level available to shutoff the dummy resistor 26, under a condition where residual hydrogen is still present, and attempt is made to wait until residual hydrogen, available for the target pressure lower limit value to be maintained, disappears. When this takes place, there is no load current consumed by the dummy resistor 26. In such a case, if the load current is used even in the presence of the drop in voltage with no oxygen present in the cathode electrode of the fuel cell body 1, hydrogen crosses over from the anode electrode to the cathode electrode, causing reaction to take place on the cathode electrode as expressed by $2H^+ + 2e^- \rightarrow H_2$ (reaction opposite to that on the anode electrode). This is because, when this takes place, although no damages occur on the fuel cell body 1, the supply of hydrogen is stopped at this time and there is no hydrogen on the anode electrode in a wasteful manner, causing a shortage of hydrogen to occur.

Further, the reason why attempt is made to wait until residual hydrogen, available to maintain the target pressure lower limit value, disappears resides in that even if residual hydrogen is discharged at once because of stopping and terminating the fuel cell system, the pressure difference does not exceed the differential pressure upper limit value between the cathode electrode and the anode electrode.

Figure 5:
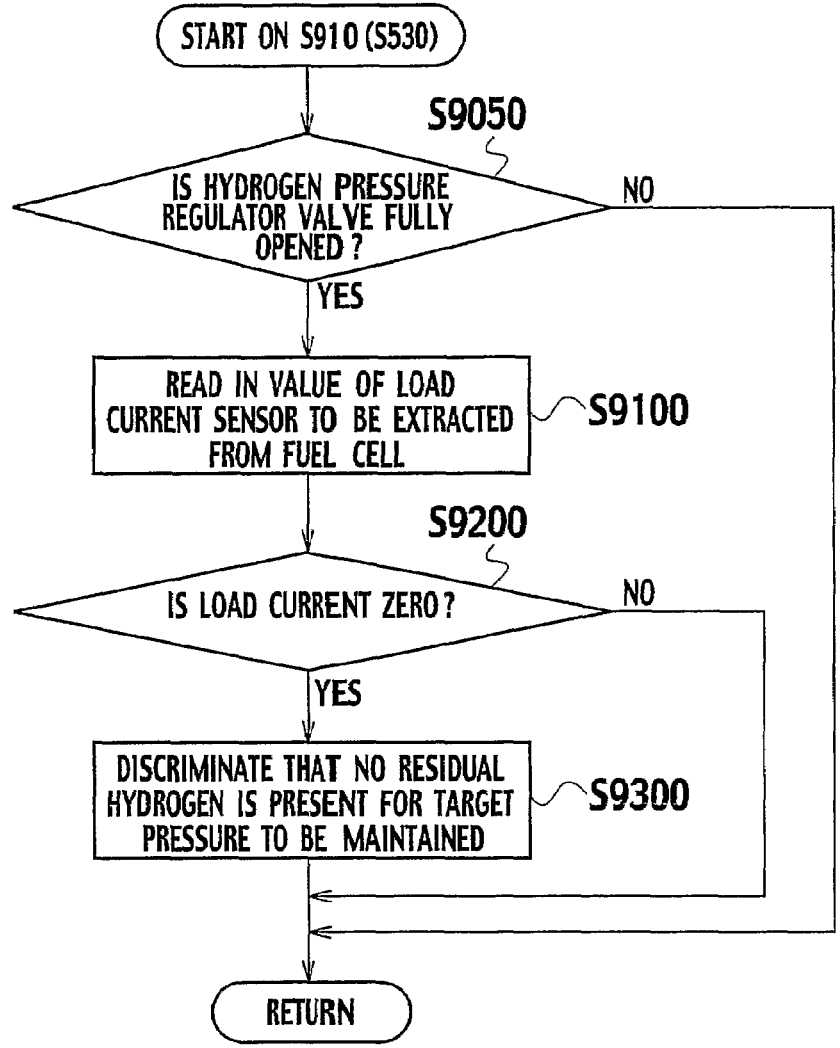
FIG. 5 is a flowchart illustrating a detailed operation of S910 shown in FIG. 4.

Next, referring to FIG. 5, detailed operations of S910 are described.

(a) In S9050, discrimination is made whether the hydrogen pressure regulator valve 4 is fully opened. If the hydrogen pressure regulator valve 4 is fully opened (with YES in S9050), the operation proceeds to S9100 and if the hydrogen pressure regulator valve 4 is not fully opened (with NO in S9050), the operation is jumped intact to step "RETURN". This is because if the hydrogen pressure regulator valve 4 is not fully opened, compressed hydrogen still remains in the upstream of the hydrogen pressure regulator valve 4.

(b) In S9100, the measured value of the load current, extracted from the fuel cell body 1, is read in.

(c) In S9200, discrimination is made whether the retrieved load current is zero. If the load current is zero (with YES in S9200), the operation proceeds to S9300 and if the load current is not zero (with NO in S9200), the operation is jumped intact to step "RETURN".

(d) In S9300, if the load current is zero, discrimination is made that no residual hydrogen for the target pressure to be maintained exists.

If the load current is extracted to consume hydrogen with the resultant reduction in residual hydrogen, a drop occurs in the amount of hydrogen incoming to the anode electrode. In order to maintain the hydrogen pressure to the target pressure, the amount of hydrogen consumed by the load current also decreases with a decrease in the amount of incoming hydrogen. With the pressure between the hydrogen supply base valve 3 and the hydrogen pressure regulator valve 4 equalized to the pressure of the inlet of the anode electrode in a balanced condition, there is no hydrogen incoming to the anode electrode. In such a way, the load current progressively decreases and finally reaches to zero. With the first embodiment, upon detection of such a moment, discrimination is made that residual hydrogen for the target pressure to be maintained is absent. Also, since the target pressure lower limit value is calculated in S50 based on the formula expressed as "Target Pressure Lower Limit Value=Pressure in Cathode Electrode+ (Differential-Pressure Restricting Upper Limit Value)", the load current becomes zero at the moment at which the pressure reaches the target pressure lower limit value, resulting in a status where residual pressure remains by only the target hydrogen-pressure lower limit value.

SECOND EMBODIMENT

Figure 7:
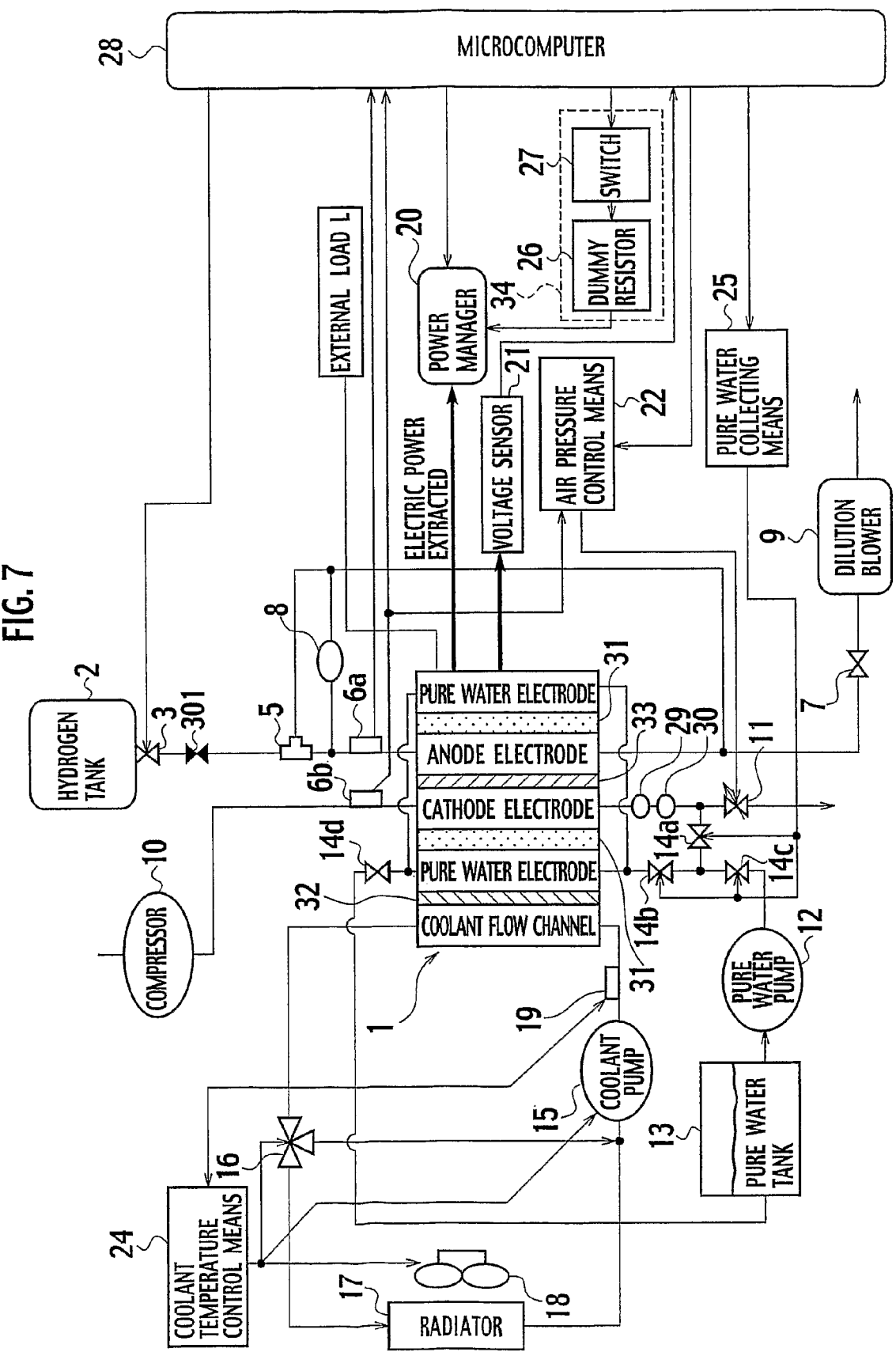
FIG. 7 is a block diagram illustrating a fuel cell system of a second embodiment according to the present invention.

As shown in FIG. 7, a fuel cell system of a second embodiment according to the present invention is a system wherein the hydrogen pressure regulator valve 4, provided in the fuel cell system shown in FIG. 1, is dispensed with in the hydrogen supply line to allow the realization of shortening a stop time with only the hydrogen pressure regulator valve 3.

Accordingly, no hydrogen pressure control means 23, which drives the hydrogen pressure regulator valve 4 to control the hydrogen pressure, is present. The other component parts are common to those of the fuel cell system of FIG. 1 and, so, description of the same is herein omitted.

Figure 8:
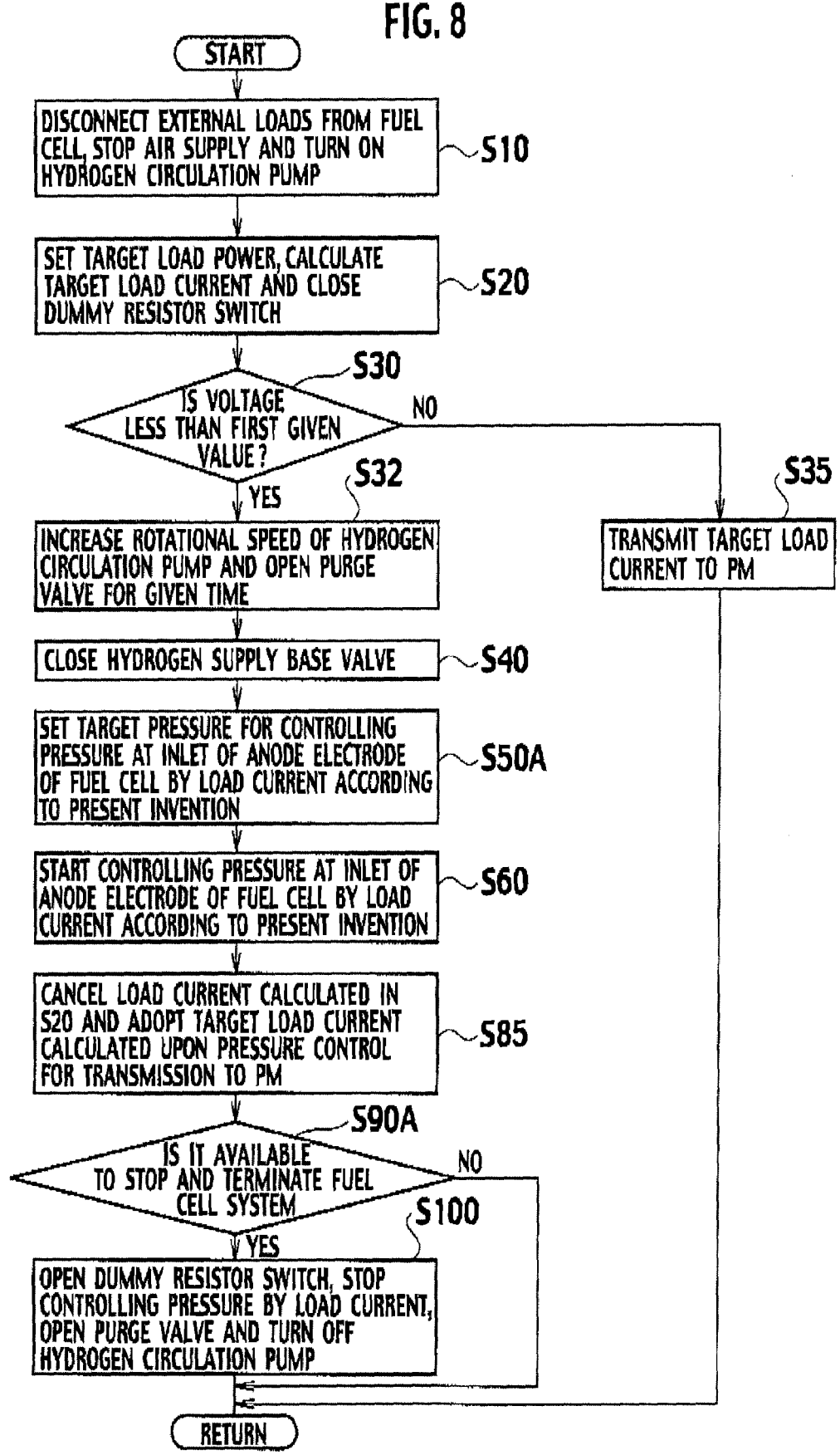
FIG. 8 is a flowchart illustrating a basic sequence of operations of the fuel cell system, shown in FIG. 7, during stopping operation thereof.

With no hydrogen pressure regulator valve 4 present, the operations to stop the operation of the fuel cell system shown in FIG. 7 are performed as shown in FIG. 8 while steps S15, S70 and S80 are omitted from the sequence shown in the flowchart of FIG. 2. Also, S50 in FIG. 2 is replaced with S50A and S90 in FIG. 2 is replaced with S90A. S100 in FIG. 2 is partly modified. The sequence of other operations (in S10, S20, S30, S32, S35, S40, S60 and S85) is common to that of the flowchart of FIG. 2. Referring to FIGS. 8 to 11, description is made of the operations for stopping the operations of the fuel cell system shown in FIG. 7.

(1) As previously described above with reference to FIG. 2, the operations in S10, S20, S30, S32, S35 and S40 are executed. That is, in S10, the external loads L are disconnected from the fuel cell body 1 and, concurrently, the compressor 10 is stopped to interrupt supplying air to the cathode electrode while fully opening the air pressure regulator valve 11. Also, the supply of hydrogen to the anode electrode is continued. The hydrogen circulation pump 8 is continuously operated.

(II) In S20, a target value (target load current) of a load current to be consumed by the dummy resistor 26 is set and, depending on this value, the target value (target load current) of the load current [A] to be extracted from the fuel cell body 1 is calculated. At the same time, the dummy resistor switch 27 is closed to connect the dummy resistor 26 to the fuel cell body 1. In S30, discrimination is made whether a voltage of the fuel cell body 1 becomes less than a given value. If the voltage is less than the given value (with YES in S30), the operation proceeds to S32 and if the voltage exceeds the given value (with NO in S30), the operation proceeds to S35. In S35, the target load current is delivered to the power manager (PM) 20 and, thereafter, the operation is jumped intact to step "RETURN".

(III) In S32, the operation is executed to increase the rotational speed of the hydrogen circulation pump 8. Also, the purge valve is opened for a given time interval and, thereafter, closed. In S40, the hydrogen supply base valve 3 is closed to stop supplying hydrogen to the anode electrode from the hydrogen tank 2.

(IV) In S50A, a target pressure is set for the pressure at the inlet of the anode electrode to be controlled by the load current according to the present invention. Details of S50A are described below with reference to FIG. 9.

(V) In S60, the operation begins to control the pressure at the inlet of the anode electrode using the load current according to the present invention. When executing this operation, as shown in FIG. 6, using the microcomputer 28 as the PI controller allows a "target load current" to be obtained based on a target pressure and a measured value resulting from the pressure sensor 6a associated with the inlet of the anode electrode.

(IV) In S85, the target load current calculated in S20 is cancelled and the target load current, calculated upon controlling the pressure at the inlet of the anode electrode by the load current according to the present invention, is adopted and delivered to the power manager (PM) 20.

(VII) In S90A, discrimination is made whether it is possible to stop and terminate the operation of the fuel cell system. Details of this operation are described below with reference to FIG. 11. If it is possible to stop and terminate the operation of the fuel cell system (with YES in S90A), the operation proceeds to S100, thereby performing operations to stop and terminate the operation of the fuel cell system. In particular, the dummy resistor switch 27 is opened and the operation of the hydrogen circulation pump 8 is stopped, while interrupting the control of pressure at the inlet of the anode electrode using the load current according to the present invention whereupon the purge valve 8 is closed. If it is impossible to stop and terminate the operation of the fuel cell system (with NO in S90A), the operation is jumped intact to step "RETURN".

Figure 9:
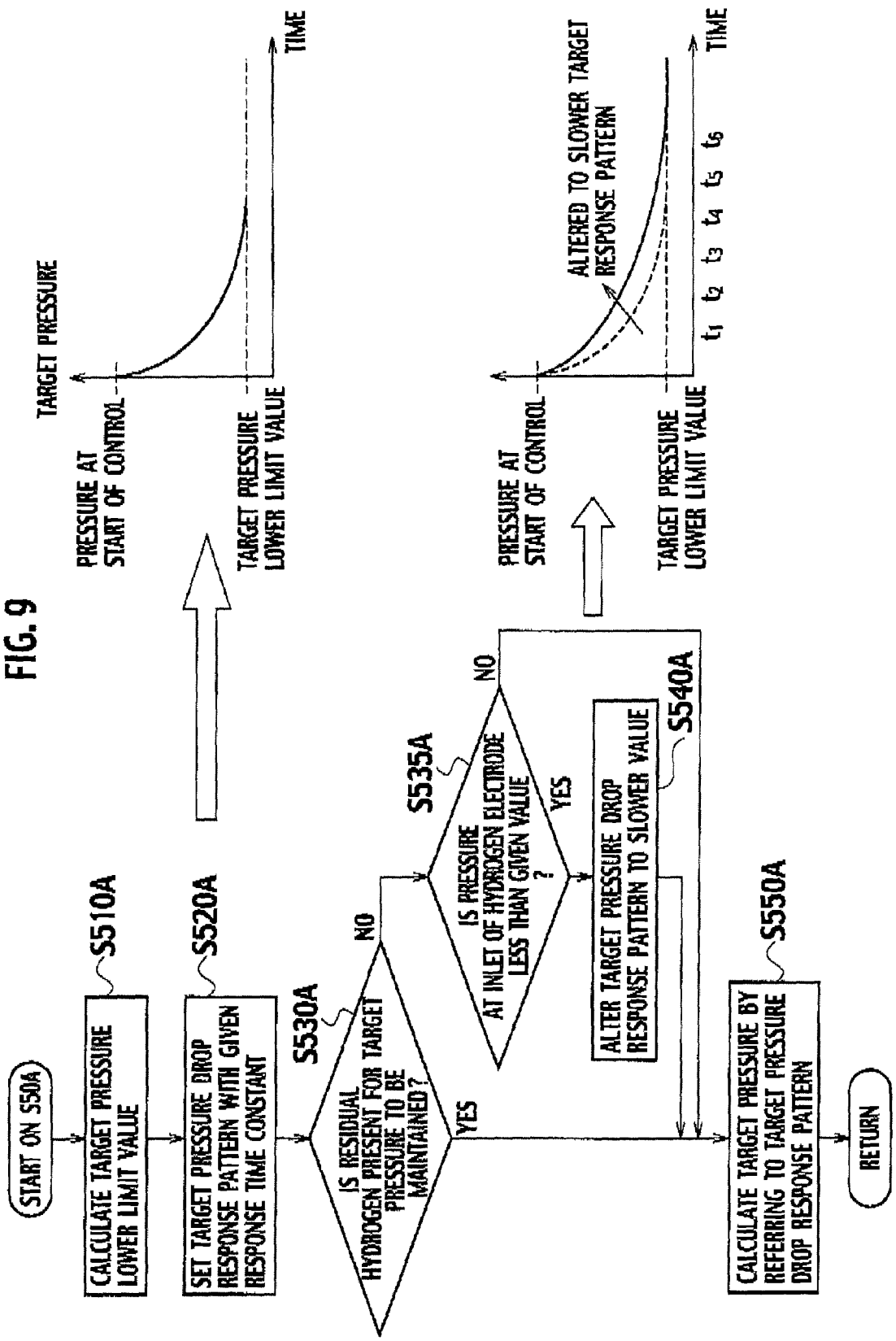
FIG. 9 is a flowchart illustrating detailed operations of S50A shown in FIG. 8.

Next, detailed operations of S50A are described with reference to FIG. 9.

(A) In S510A, the target pressure is set for the pressure of the inlet of the anode electrode to be controlled by the load current according to the present invention. With the second embodiment, a target pressure lower limit value is calculated based on a dilution capacity of the dilution blower 9.

(B) In S520A, a target pressure drop response pattern is set with a given response time constant. With the second embodiment, the pressure at the inlet of the anode electrode is regulated on the target pressure drop response pattern such that the pressure at the inlet of the anode electrode drops at the given response time constant. Therefore, the lower the pressure at the inlet of the anode electrode, the less will be the rate of change per unit time in the target pressure. This results in an action where the pressure, prevailing in a subsequent step of controlling the pressure at the inlet of the anode electrode by the load current, is lowered to cause a decrease in the rate of change of the load current, per unit time, to be extracted from the fuel cell body 1 with a decrease in residual hydrogen whereby when there is a less residual hydrogen, it becomes possible to minimize fears of the occurrence in a shortage of hydrogen due to the load current being extracted in excess.

(C) In S530A, discrimination is made whether residual hydrogen exists for the target pressure to be maintained. A detailed sequence of operations in S530A is described below with reference to FIG. 11. When discrimination is made that residual hydrogen still exists for the target pressure to be maintained (with NO in S530A), the operation proceeds to S535A, where discrimination is made whether the pressure at the inlet of the anode electrode is less than the given value. If the pressure at the inlet of the anode electrode is less than the given value (with YES in S535A), the operation proceeds S540A, where the target pressure drop response pattern is altered to another target pressure drop response pattern that provides a slower response than that of the target pressure drop response pattern set in S520A. It is thus contemplated that upon consumption of hydrogen to remove residual hydrogen the resultant drop in the pressure at the inlet of the anode electrode, no shortage of hydrogen occurs when the load current is caused to flow through the dummy resistor 26 for consumption of hydrogen.

(D) If discrimination is made that no residual hydrogen available for the target pressure to be maintained (with YES in S530A) exists and the pressure at the inlet of the anode electrode exceeds the given value (with NO in S535A), the operation proceeds to S550A. In S550A, the target pressure is calculated by referring to the target pressure drop response pattern.

Next, detailed operations in S510A are described with reference to FIG. 10.

(a) In S5100A, tile amount Q of hydrogen, flowing through the purge delivery passage, is estimated using the following equations (4) and (5):

$$Q(m^3/s) = K^* Ao^* (2\Delta P/\rho)^{1/2} \quad (4)$$

$$Ao[m^2] = (\pi/4)^* Do^2 \quad (5)$$

When this takes place, repeated cycles of calculations are executed as a variable of the pressure of the anode electrode. It doesn't matter for such calculations that calculated results are obtained by preliminarily conducted calculations and stored in the microcomputer.

where Do[m] represents an orifice diameter of the purge valve 7, ΔP represents a pressure (variable) of the anode electrode from which the atmospheric pressure is subtracted, ρ[kg/m$^3$] represents a density of hydrogen gas, K represents a coefficient of the flow rate, Ai is expressed as Ai[m$^2$]=(π/4)*Di$^2$, and Di[m] represents a diameter of a conduit.

Figure 10:
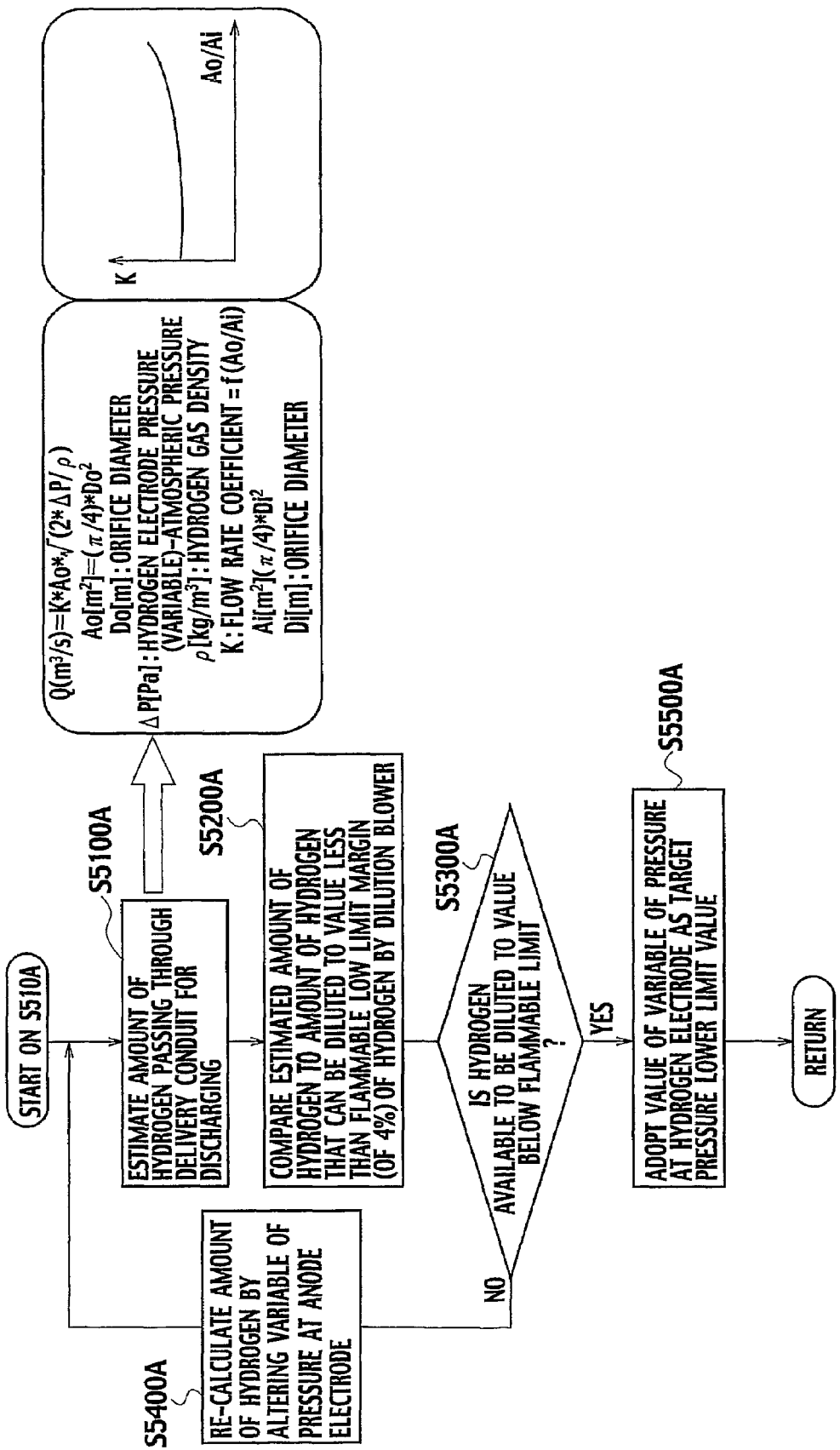
FIG. 10 is a flowchart illustrating detailed operations of S510A shown in FIG. 9.

The coefficient K of the flow rate is a factor of (Ao/Ai) as expressed as (K=f(Ao/Ai)) as shown in FIG. 10.

(b) In S5200A, discrimination is made whether the result Q, calculated by substituting a proper initial value into the pressure variable of the anode electrode, lies at a value less than the amount of hydrogen available to be diluted to a value less than a flammable lower limit (of 4%) of hydrogen by the use of the dilution blower 9. If discrimination is made that the amount of calculated hydrogen can be diluted to the value less than the flammable lower limit (of 4%) of hydrogen (with YES in S5300A), the operation proceeds to S5500A, wherein a value of the pressure variable of the anode electrode is adopted as the target pressure lower limit value. If discrimination is made that the amount of hydrogen exceeds the flammable lower limit (of 4%) and is unavailable to be diluted (with NO in S5300A), the operation proceeds to S5400A, where the pressure variable of the anode electrode is altered for re-calculation whereupon the operation is routed back to S5100A.

Figure 11:
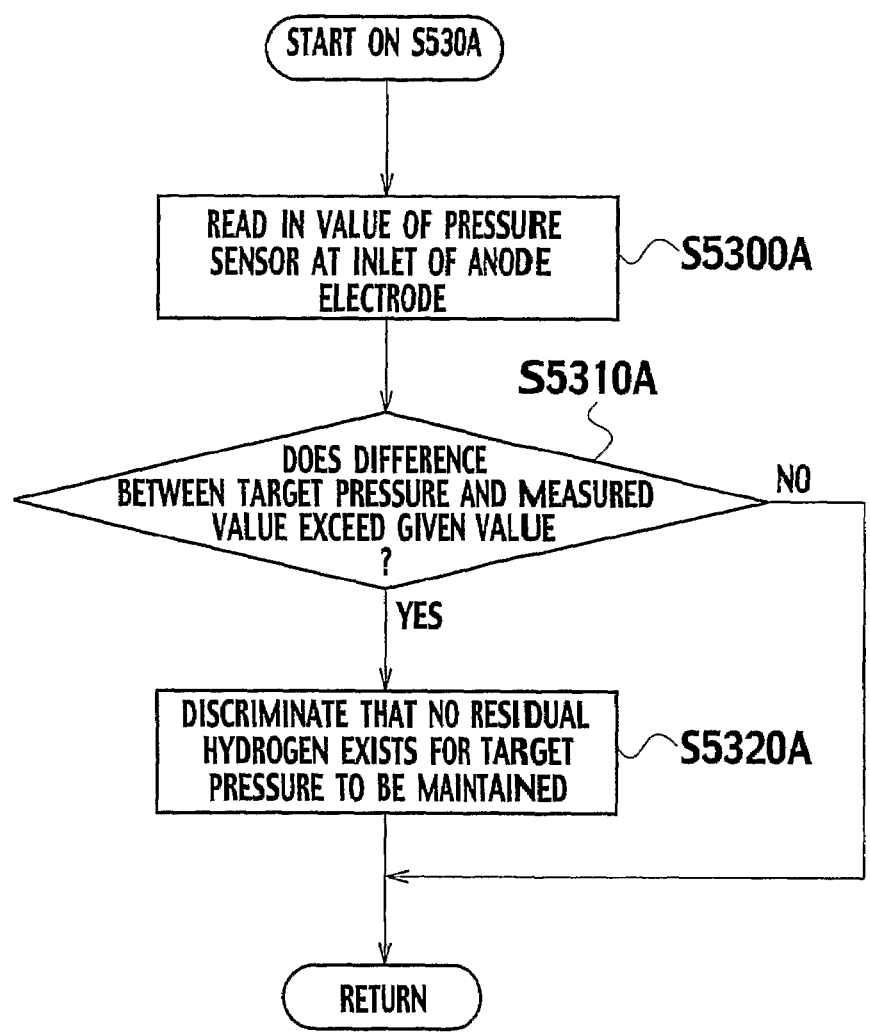
FIG. 11 is a flowchart illustrating detailed operations of S530 shown in FIG. 9.

Next, detailed operations of S530A are described below with reference to FIG. 11.

(I) In S5300A. a measured value of the pressure sensor 6 at the inlet of the anode electrode is read in.

(II) In S5310A, discrimination is made whether a difference between the target pressure at the inlet of the anode electrode and the measured value of the pressure sensor 6a exceeds a given value.

(III) If the difference between the target pressure and the measured value of the pressure sensor 6a exceeds the given value (with YES in S5310A), the operation proceeds to S5320A and discrimination is made that there is no residual hydrogen for the target pressure to be maintained. If the difference between the target pressure and the measured value of the pressure sensor 6a does not exceed the given value (with NO in S5310A), the operation is jumped intact to step of "RETURN". With the second embodiment, discrimination is made in S5320A that, when the value of the target pressure at the inlet of the anode electrode, from which the measured value of the pressure sensor 6a is subtracted, exceeds a positive given value, there is no residual hydrogen for the target pressure to be maintained.

With the second embodiment, since the hydrogen supply line only incorporates the hydrogen supply base valve 3, the pressure between the hydrogen supply base valve 3 and the anode electrode remains in a balanced condition when the hydrogen supply is stopped in S40 to cause the hydrogen supply base valve 3 to be closed. Therefore, if such a condition remains intact, no residual hydrogen flows into the anode electrode. No flow of residual hydrogen occurs unless the load current is extracted to cause a drop in the pressure of the anode electrode.

To this end, the target pressure is lowered with the given response time constant and the pressure at the inlet of the anode electrode is controlled by the load current flowing through the dummy resistor 26, thereby permitting the load current to be extracted from the fuel cell body 3 in an effort to decrease the pressure to the target pressure. Then, residual hydrogen begins to flow into the fuel cell body 1 by the same amount as that consumed by the load current (in cubic expansion). Thus, the amount of hydrogen consumed by the load current, flowing through the dummy resistor 26, equals the amount of hydrogen flowing into the anode electrode, no shortage of hydrogen takes place even if the hydrogen supply is interrupted and the load current is caused to flow through the dummy resistor 26 with the resultant drop in the voltage of the fuel cell body 1. In such a way, if the load current is extracted for consumption of hydrogen and residual hydrogen is minimized, the same amount of hydrogen as that of hydrogen consumed by the load current is lost, resulting in a drop in the pressure at the inlet of the anode electrode to a value less than the target pressure. In the detailed flowchart for S530A shown in FIG. 11, this moment is detected for executing discrimination that there is no hydrogen available for the target pressure to be maintained.

Also, S90A is comprised of S910 to S930 shown in FIG. 4. In S910, discrimination is made in the same sequence as that of S530A in FIG. 11 whether residual hydrogen available for the target pressure to be maintained is present. If no residual hydrogen available for the target pressure to be maintained is absent (with YES in S910, the operation proceeds to S920A, where discrimination is made whether the pressure prevailing at the inlet of the anode electrode is less than a minimal lower value. The minimal lower limit value is determined to take a value lying at the amount of hydrogen that can be diluted to a flammable lower limit margin (of 4%) of hydrogen with the dilution blower 9 operated in S510A. Accordingly, if discrimination is made in S920 that the pressure lays at the minimal lower limit vale (with YES in S920), since hydrogen can be diluted to a value less than the flammable limit even if residual hydrogen is discharged at once, discrimination is made in S930 that the fuel cell system can be halted.

The entire content of Japanese Application No. P2004-039884 with a filing date of Feb. 17, 2004 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

INDUSTRIAL APPLICABILITY

As set forth above, according to the present invention, during the halt of the fuel cell system, the catalyst degradation-suppressing device is used to execute operations wherein in the course of connecting the dummy resistor 26 to the fuel cell body 1 to cause a drop in the voltage thereof (after the voltage of the fuel cell body 1 drops to the given voltage), the supply of hydrogen is stopped and residual hydrogen is consumed by the load current flowing through the dummy resistor 26. Concurrently, the operations are executed to suppress the catalyst from degrading and residual hydrogen is lowered to the atmospheric pressure, thereby enabling the shortening of the time for the fuel cell system to be stopped and terminated.

As shown in FIGS. 12A and 12B, the operations are executed by: (a) waiting until the voltage drops to the given voltage at which the supply of hydrogen can be stopped; (b) interrupting the supply of hydrogen at the relevant given voltage; and (c) permitting residual hydrogen to be consumed the load current flowing through the dummy resistor 26 and concurrently executing the operations to suppress the catalyst from degrading and decrease residual hydrogen to the atmospheric pressure. On the contrary, with the related art stop method, the operations are executed by: (1) waiting until the voltage reaches to a given voltage at which the dummy resistor 26 can be shutoff while supplying hydrogen; (2) interrupting the supply of hydrogen at the relevant given voltage; and (3) diluting residual hydrogen by the dilution blower 9. Therefore, as shown in FIG. 12C, the present invention makes it possible to shorten the stop time by a time period for which the operations are concurrently executed to suppress the catalyst from degrading and to lower residual hydrogen to the atmospheric pressure.

Further, after the supply of hydrogen is interrupted, the target load current, to be extracted from the fuel cell body 1 in a way to allow the pressure of anode electrode to be maintained at the given pressure, is calculated to control the hydrogen electrode pressure in a way to consume residual hydrogen. The pressure characteristic of the anode electrode corresponds to an integrated product in which the amount Qout of hydrogen consumed by the anode electrode is subtracted from the amount Qin of hydrogen, flowing into the anode electrode, and is expressed by a formula (Pressure=K∫(Qin−Qout)dt). In order for the pressure of the anode electrode to be maintained at the given target pressure, the amount Qin of incoming hydrogen needs to be equal to the amount Qout of consumed hydrogen. Due to such an action, if the load current, extracted from the fuel cell body 1, is controlled in a way to allow the pressure of the anode electrode to be maintained at the given pressure, the amount of hydrogen incoming to the anode electrode and the amount of hydrogen consumed by the load current become equal, to one another, enabling the prevention of a shortage of hydrogen.

Figure 13A:
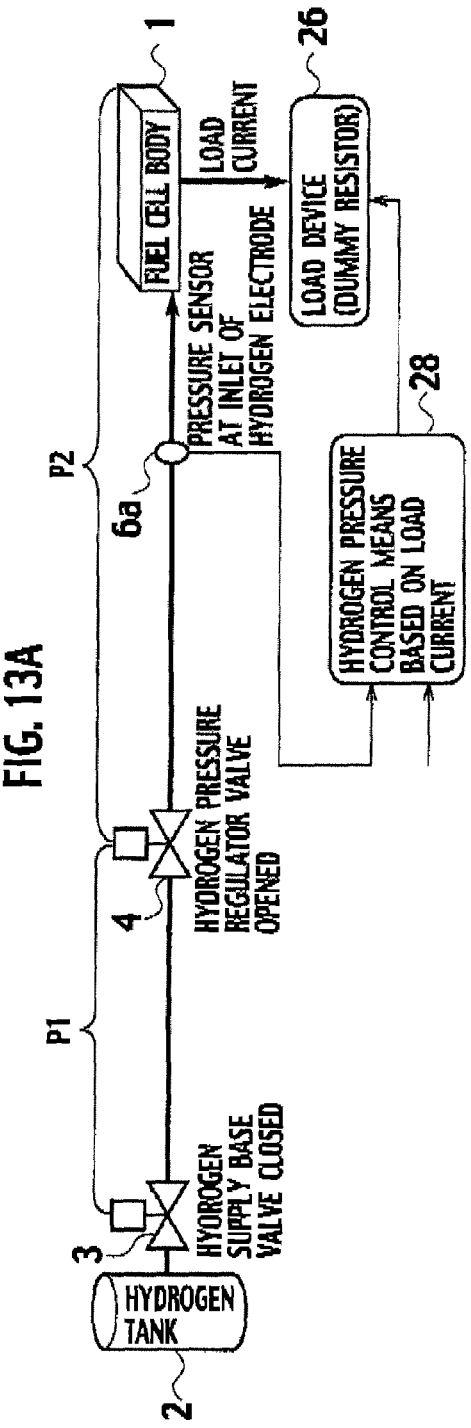
FIGS. 13A to 13C are views illustrating second effects resulting from the first and second embodiments.

As shown in FIG. 13A, when a large amount of compressed residual hydrogen exists in the upstream of the inlet of the anode electrode of the fuel cell body 1 and the pressure P1 is higher than the pressure P2 at the inlet of the anode electrode, hydrogen tends to flow into the anode electrode by Δq. As shown in FIG. 13B, if P1 is higher than P2, the presence of an increase in the pressure at the inlet of the anode electrode due to residual hydrogen incoming to the anode electrode increases the amount of hydrogen consumed by the flow of the load current only by the same amount of Δq to enable the target pressure to be maintained, thereby enabling the consumption of residual hydrogen in a way to preclude the shortage of hydrogen.

Figure 13C:
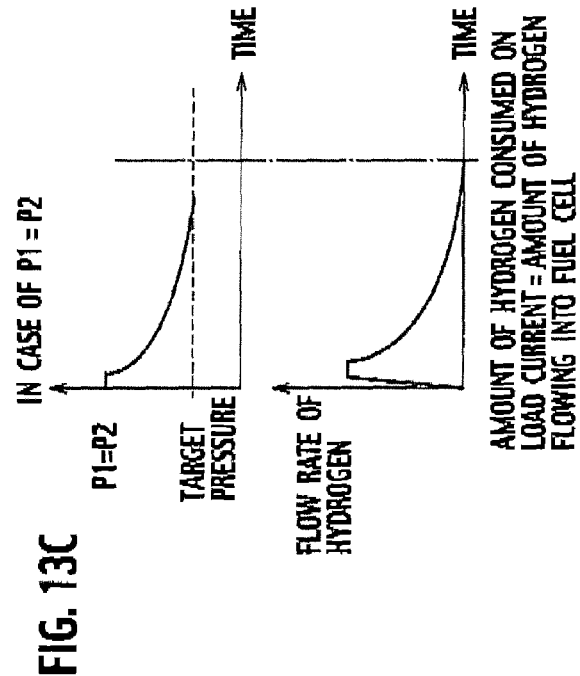
Figure 13B:
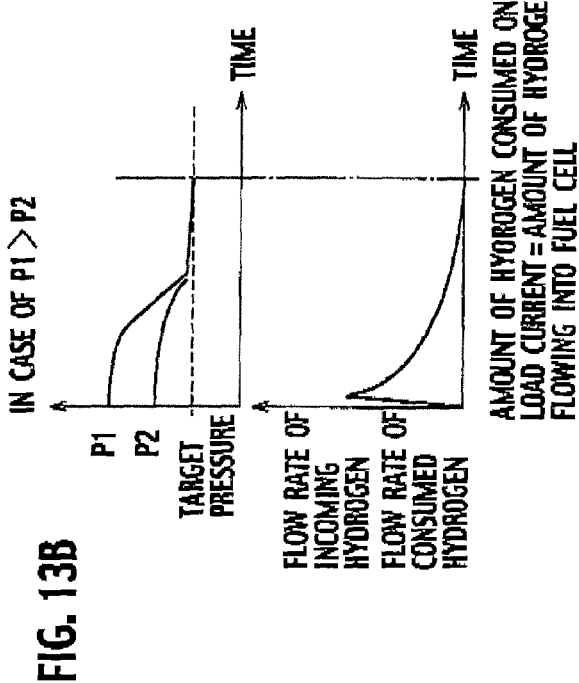

Further, if the pressure P1 at the inlet of the anode electrode equals the pressure P2 at the upstream of the anode electrode (as expressed as P1=P2), as shown in FIG. 13C, a pressure-balanced condition exists and, if such a condition is kept intact, no hydrogen flows into the anode electrode. Here, if the load current is caused to increase by a value corresponding to Δq, the pressure at the inlet of the anode electrode tends to decrease. Then, hydrogen flows into the anode electrode by the same amount of Δq as that of hydrogen consumed by the load current to allow the target pressure to be maintained, enabling the consumption of residual hydrogen in a way to preclude the shortage of hydrogen. This is because hydrogen (hydrogen in volumetric expansion) prevailing in an entire inside line involved in a pressure balance can be consumed.

Furthermore, in normal practice, the reaction between hydrogen and oxygen occurring on the fuel cell body 1 causes oxygen of (½) mol to be consumed in terms of hydrogen of 1 mol and, so, hydrogen is consumed at a higher rate than that of oxygen. Thus, if the supply of gases to both the anode electrode and the cathode electrode are interrupted and the load current is continuously consumes in subsequent step, hydrogen, remaining in the anode electrode, is consumed faster than oxygen remaining in the cathode electrode, thereby causing a probability with the shortage of hydrogen. With the present invention, since upon a start of executing the operation of the catalyst degradation-suppressing device, oxygen is consumed to be lost to cause a decrease in the amount of residual oxygen whereupon the hydrogen supply is stopped, residual oxygen in the cathode electrode can be consumed without causing the shortage of hydrogen.

Moreover, when controlling the hydrogen pressure using the hydrogen pressure regulator valve 4, if a large load current is caused to flow to consume residual hydrogen with a view to shortening the stop time, there are probabilities where an imbalance occurs between hydrogen consumed with the load current and hydrogen flowing into the anode electrode with the resultant shortage of hydrogen. With the present invention, since the operation is switched to step of executing the anode-electrode pressure control based on the load current operation such that the amount of hydrogen consumed with the load current equals the amount of hydrogen flowing into the anode electrode, the shortage of hydrogen can be prevented.

In addition, according to the present invention, discrimination is made when the load current control device is executed that no residual hydrogen available for the target pressure to be maintained is absent. When the hydrogen supply is stopped, as residual hydrogen is consumed so as to maintain the pressure of the anode electrode at the target pressure, the amount of hydrogen, consumed by the load current, progressively decreases to zero due to the target pressure being maintained. In cases where the load current progressively decreases to zero in such a way and the load current drops below a given value, it can be discriminated that residual hydrogen for the target pressure to be maintained is lost.

Figure 14A:
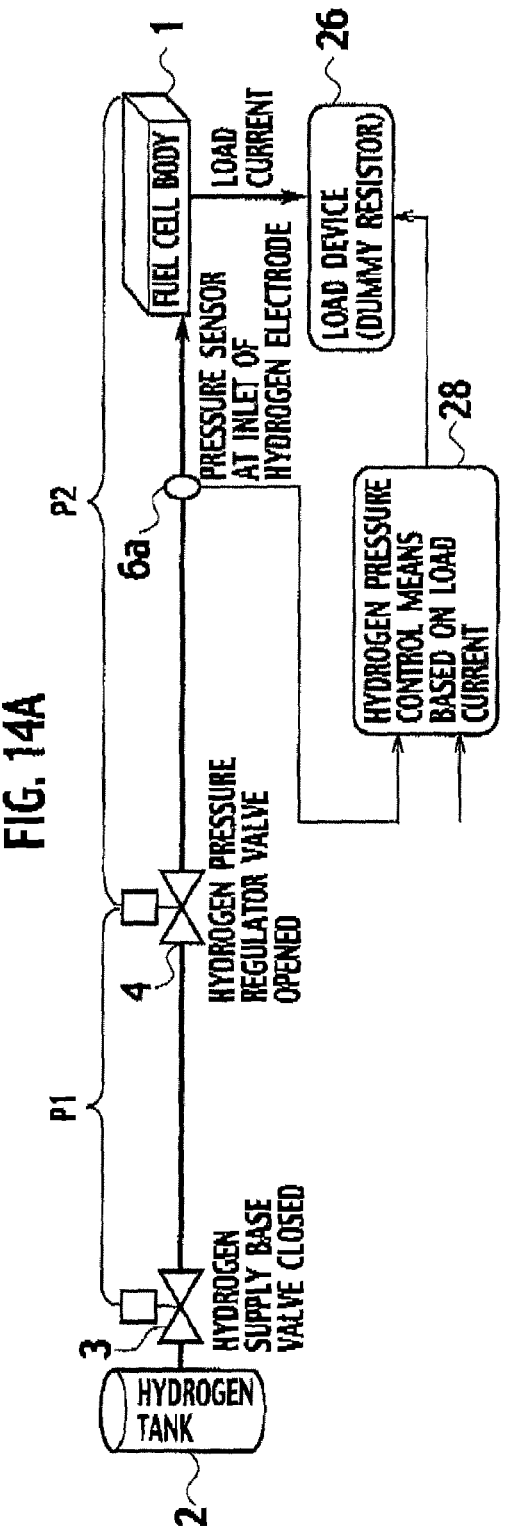
FIGS. 14A to 14C are views illustrating third effects resulting from the first and second embodiments.

As shown in FIG. 14A, when a large amount of compressed residual hydrogen exists in the upstream of the inlet of the anode electrode of the fuel cell body 1 and the pressure P1 is higher than the pressure P2 at the inlet of the anode electrode, hydrogen tends to flow into the anode electrode by a value of Δq. As shown in FIG. 14B, if P1 is higher than P2 and the pressure at the inlet of the anode electrode tends to increase due to residual hydrogen incoming to the anode electrode, the presence of flow of load current allows the amount of hydrogen to be consumed by the same rate as that of incoming hydrogen to cause a balance condition to appear at the target pressure whereupon the amount of incoming hydrogen and load current become zero. Consequently, by detecting the absence of the amount of residual hydrogen before an actual pressure of the anode electrode drops below the target pressure, discrimination can be made to find a timing at which the extraction of the load current is to be terminated. Also, if a high probability exists for the occurrence of a shortage of hydrogen when residual hydrogen runs short and hydrogen is consumed further more by the load current flowing through the dummy resistor 26, no attempt is made to extract the load current to enable the prevention of the shortage of hydrogen.

Figure 14C:
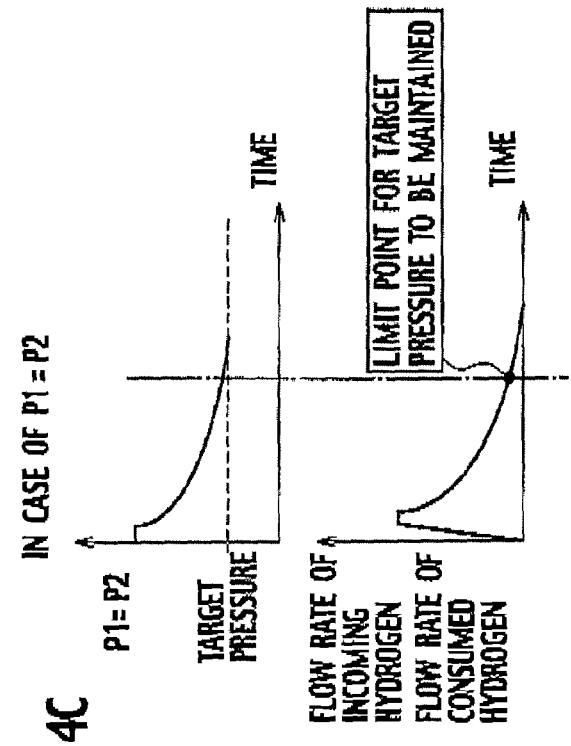
Figure 14B:
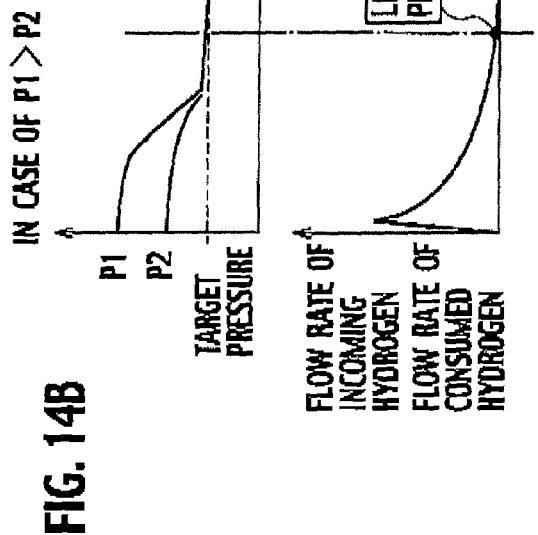

Further, if the pressure P1 at the inlet of the anode electrode equals the pressure P2 at the upstream of the anode electrode (as expressed as P1=P2), as shown in FIG. 14C, a pressure-balanced condition exists and, if such a condition is kept intact, no hydrogen flows into the anode electrode. Here, if the load current is caused to increase by a rate corresponding to the value of Δq, the pressure at the inlet of the anode electrode tends to decrease. Then, the load current is caused to flow to consume the same amount of hydrogen as that of incoming hydrogen (i.e., to consume hydrogen involved in the entire system under a balanced pressure) and a balanced condition is present at the target pressure whereby the amount of incoming hydrogen and the load current become zero. When this takes place, the fuel cell system can be terminated even when the voltage of the fuel cell body 1 does not drop below a sufficiently low level. This makes it possible to prevent the catalyst from degrading, due to the shortage of hydrogen, which results in worse degradation losses than those of platinum catalyst dissolving degradation resulting from the exposure of the fuel cell body 1 to a high voltage condition.

In addition, as shown in FIG. 15, according to the present invention, during a period in which the load current control device is executed, the target pressure is lowered such that the lower the pressure of the anode electrode, the slower will be the drop speed of the target pressure. Altering the target pressure to a further decreased value results in an action to cause an increase in the amount of hydrogen to be consumed by the load current, resulting in a capability of decreasing residual pressure of the anode electrode at a fast rate for thereby enabling the shortening of the stop time.

Further, by altering the target pressure such that the lower the pressure of the anode electrode, the slower will be the drop speed of the target pressure, the rate of change per unit time in the amount of hydrogen to be consumed is able to cause a reduction in the amount of residual hydrogen, enabling reduction in a risk of shortage of hydrogen when the amount of residual hydrogen is getting low.

Furthermore, according to the present invention, hydrogen is circulated in a continuous fashion until the fuel cell system is terminated from the start of executing the operation of the catalyst degradation-suppressing device. Thus, it becomes possible to reduce the risk of shortage of hydrogen in the course of interrupting the hydrogen supply during the execution of the catalyst degradation-suppressing device to allow the load current to flow through the dummy resistor 26 to cause the consumption of residual hydrogen.

In addition, according to the present invention, the purge valve 7 is opened to purge gaseous impurities, other than hydrogen, staying in the anode electrode to the outside to allow an inside of the hydrogen circulation path to be filled with fresh hydrogen prior to interrupting the supply of hydrogen during the execution of the catalyst degradation-suppressing device. Thus, it becomes possible to reduce the risk of shortage of hydrogen in the middle of a process wherein the hydrogen supply is stopped during the execution of the catalyst degradation-suppressing device to allow the load current to flow through the dummy resistor 26 to cause the consumption of residual hydrogen.

The invention claimed is:

1. A fuel cell system comprising:
a fuel cell body having an anode electrode supplied with fuel gas containing hydrogen and a cathode electrode supplied with oxidizer gas;
a catalyst degradation-suppressing device operative to interrupt supplying oxidizer gas to the cathode electrode after disconnecting an external load from the fuel cell body and allow a load current, generated by the fuel cell body, to be extracted by an internal load while supplying the fuel gas to the anode electrode;
a hydrogen supply stop device operative to interrupt a supply of the fuel gas to the anode electrode except for residual hydrogen being supplied thereto during a period in which the load current is extracted by the internal load; and
a load current control device configured to control a target load current such that after the supply of fuel gas to the anode electrode is stopped, a pressure inside the anode electrode is maintained at a target pressure.

2. The fuel cell system according to claim 1, wherein catalyst degradation-suppressing device stops extracting the load current by the internal load when the target load current drops below a given value.

3. The fuel cell system according to claim 1, wherein the load current control device lowers the target pressure such that the lower the pressure inside the anode electrode, the slower will be the drop speed in the target pressure.

4. The fuel cell system according to claim 1, further comprising:
a hydrogen circulation path through which exhaust hydrogen, expelled from an outlet of the anode electrode, is circulated to an inlet of the anode electrode; and
a hydrogen circulation device by which fuel gas is circulated; and
wherein the hydrogen circulation device is actuated prior to extracting the load current by the internal load.

5. The fuel cell system according to claim 1, further comprising:
a purge valve connected to an outlet of the anode electrode; and
wherein the purge valve is opened prior to interrupting the supply of fuel gas to the anode electrode.

6. The fuel cell system according to claim 1, further comprising:
a hydrogen pressure regulator valve connected to an inlet of the anode electrode for regulating the pressure at the inlet of the anode electrode to a given pressure during the period in which the load current is extracted by the internal load.

7. The fuel cell system according to claim 6, further comprising:
a pressure sensor sensing the pressure at the inlet of the anode electrode to provide a measured pressure; and
hydrogen pressure control means responsive to the measured pressure delivered from the pressure sensor for controlling the hydrogen pressure regulator valve to allow fuel gas to be compensated by a rate consumed by the fuel cell body during the period in which the load current is extracted by the internal load.

8. The fuel cell system according to claim 1, wherein when the pressure in the anode electrode is maintained at the target pressure, the amount of residual hydrogen flowing into the anode electrode from a downstream of the hydrogen supply stop device nearly equals the amount of hydrogen consumed by the load current.

9. The fuel cell system according to claim 1, further comprising:
a pressure sensor sensing a pressure at an inlet of the anode electrode to provide a measured pressure; and
wherein the catalyst degradation-suppressing device provides the target load current based on the target pressure and the measured pressure delivered from the pressure sensor.

10. The fuel cell system according to claim 9, wherein the catalyst degradation-suppressing device determines a first target pressure drop response pattern and a second target pressure drop response pattern that is slower in rate of response than that of the first target pressure drop response pattern whereby when the pressure in the anode electrode is below a given value, the second target pressure drop response pattern is selected to allow the load current control device to vary the target load current in accordance with the second target pressure drop response pattern.

11. The fuel cell system according to claim 1, further comprising:
- dilution means connected to an outlet of the anode electrode to dilute hydrogen to be exhausted to a given concentration; and
- wherein the catalyst degradation-suppressing device is operative to set a target pressure lower limit value based on a dilution capacity of the dilution means.

12. The fuel cell system according to claim 1, further comprising:
- a voltage sensor detecting a given voltage of the fuel cell body to provide a detected voltage; and
- wherein the catalyst degradation-suppressing device is operative to cause the hydrogen supply stop device to interrupt the supply of fuel gas to the anode electrode in response to the detected voltage.

13. A fuel cell system comprising:
- a fuel cell body having an anode electrode supplied with fuel gas containing hydrogen and a cathode electrode supplied with oxidizer gas;
- catalyst degradation-suppressing means for interrupting a supply of oxidizer gas to the cathode electrode after disconnecting an external load from the fuel cell body and allow a load current, generated by the fuel cell body, to be extracted by an internal load while supplying the fuel gas to the anode electrode;
- hydrogen supply stop means for interrupting a supply of fuel gas to the anode electrode except for residual hydrogen being supplied thereto during a period in which the load current is extracted by the internal load; and
- load current control means for controlling a target load current such that after the supply of fuel gas to the anode electrode is stopped, a pressure inside the anode electrode is maintained at a target pressure.

14. A method of operating a fuel cell system, comprising:
- providing a fuel cell body having an anode electrode supplied with fuel gas containing hydrogen and a cathode electrode supplied with oxidizer gas;
- providing an internal load;
- interrupting a supply of oxidizer gas to the cathode electrode after disconnecting an external load from the fuel cell body;
- connecting the internal load to the fuel cell body to allow a load current to be extracted from the fuel cell body while supplying the fuel gas to the anode electrode;
- interrupting a supply of the fuel gas to the anode electrode except for residual hydrogen being supplied thereto during a period in which the load current is extracted by the internal load; and
- controlling a target load current such that after the supply of fuel gas to the anode electrode is interrupted, a pressure inside the anode electrode is maintained at a target pressure.

* * * * *